(12) United States Patent
Iyasu et al.

(10) Patent No.: US 10,615,680 B2
(45) Date of Patent: Apr. 7, 2020

(54) CONTROL APPARATUS FOR POWER CONVERTER

(71) Applicant: DENSO CORPORATION, Kariya, Aichi-pref. (JP)

(72) Inventors: Seiji Iyasu, Nisshin (JP); Yuji Hayashi, Nisshin (JP); Yuichi Handa, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/370,842

(22) Filed: Mar. 29, 2019

(65) Prior Publication Data

US 2019/0305664 A1 Oct. 3, 2019

(30) Foreign Application Priority Data

Mar. 30, 2018 (JP) .................... 2018-069527

(51) Int. Cl.
  *H02M 7/217* (2006.01)
  *H02M 1/08* (2006.01)
  *H02M 7/539* (2006.01)
  *H02M 7/06* (2006.01)
  *H02M 1/00* (2006.01)

(52) U.S. Cl.
  CPC .............. *H02M 1/08* (2013.01); *H02M 7/06* (2013.01); *H02M 7/217* (2013.01); *H02M 7/539* (2013.01); *H02M 2001/0009* (2013.01)

(58) Field of Classification Search
  CPC ............ H02M 7/02; H02M 7/04; H02M 7/12; H02M 7/21; H02M 7/217; H02M 7/2176
  See application file for complete search history.

(56) References Cited

U.S. PATENT DOCUMENTS

| 9,722,500 B2 * | 8/2017 | Usami ................... H02M 1/126 |
| 2014/0211526 A1 * | 7/2014 | Pidutti ................ H02M 1/4225 |
| | | 363/84 |
| 2014/0247029 A1 * | 9/2014 | Krabbenborg ........ H02M 3/156 |
| | | 323/282 |

FOREIGN PATENT DOCUMENTS

JP  2015-198460 A  11/2015

* cited by examiner

*Primary Examiner* — Gary L Laxton
(74) *Attorney, Agent, or Firm* — Oliff PLC

(57) ABSTRACT

In a control apparatus for a power converter, a current obtainer obtains a current flowing through an inductor as an inductor current, and a voltage obtainer obtains an alternating-current voltage. A slope compensation unit generates, based on the alternating-current voltage obtained by the voltage obtainer, a slope compensation signal having a slope that depends on the alternating-current voltage, and adds the slope compensation signal to the inductor current obtained by the current obtainer. A current controller controls on-off switching operations of a switch in a peak current mode to thereby cause the inductor current, to which the slope compensation signal has been added, to follow a sinusoidal command current that depends on the alternating-current voltage.

12 Claims, 20 Drawing Sheets

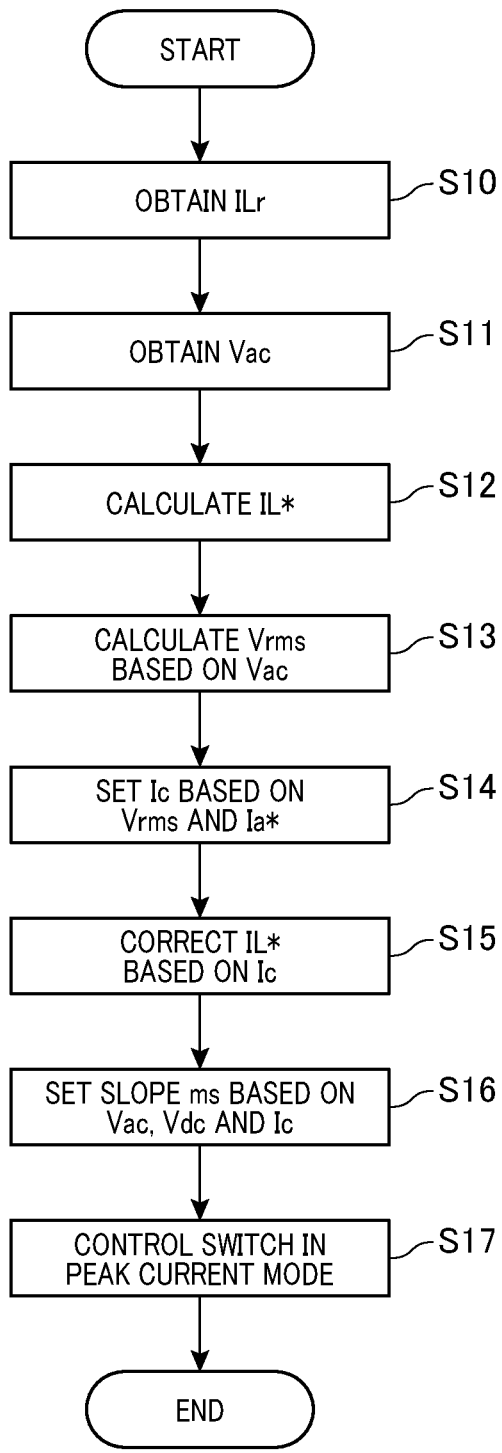

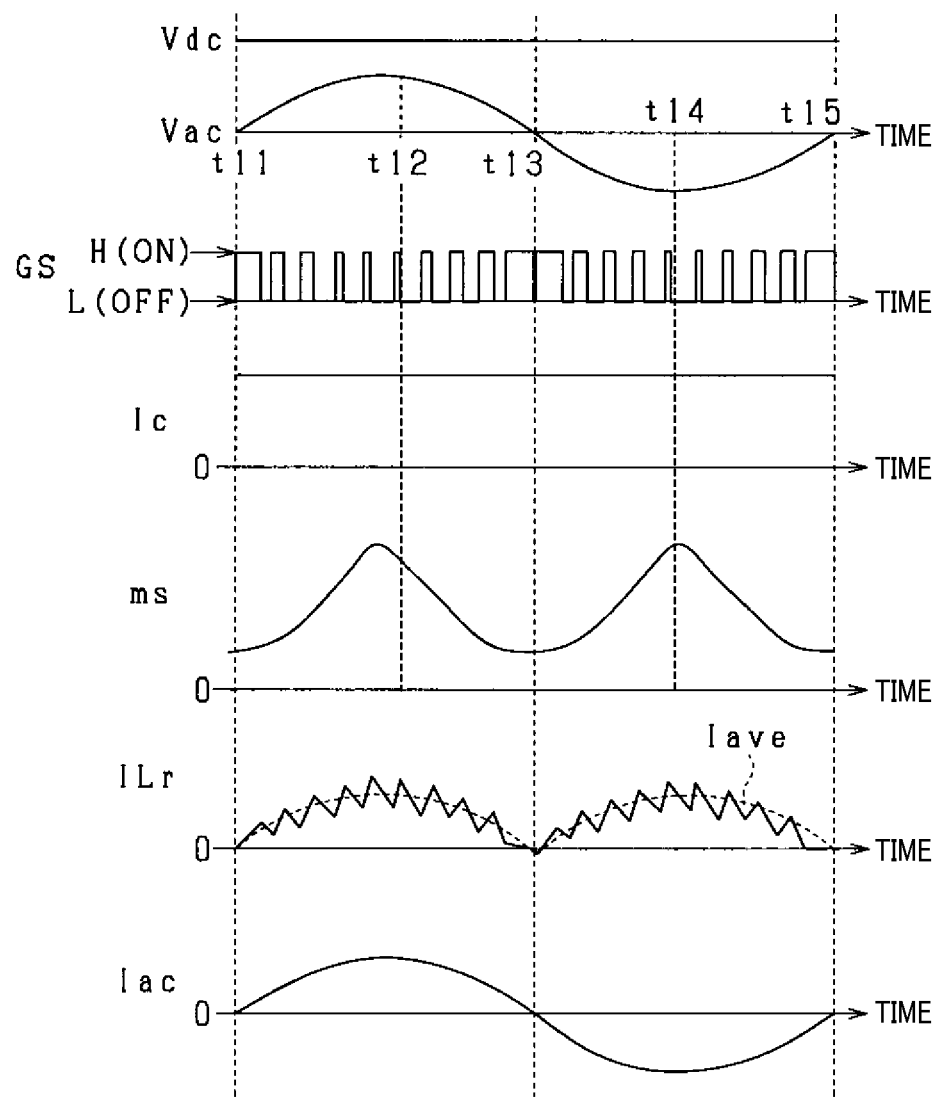

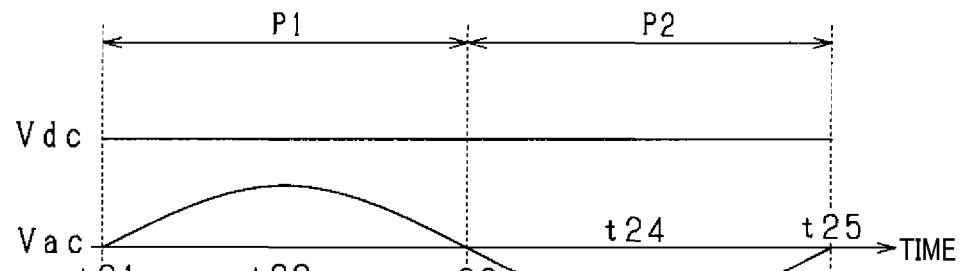
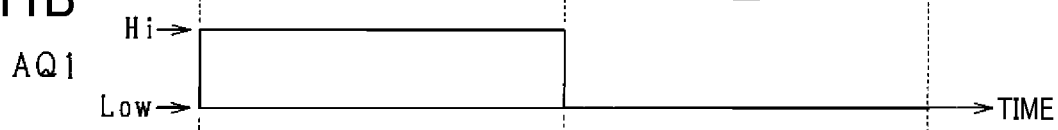
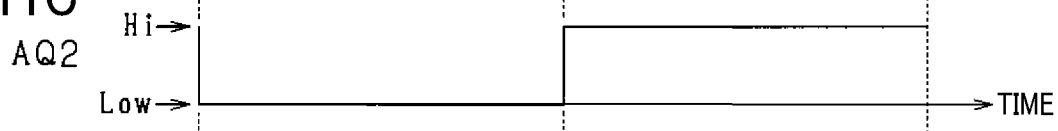
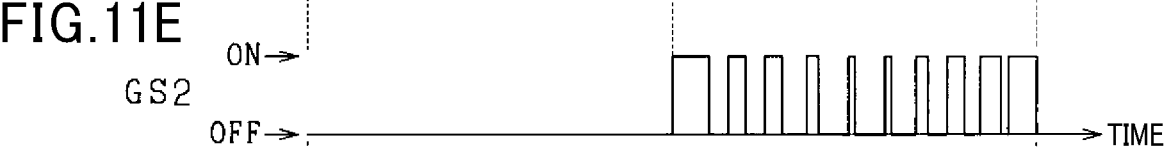
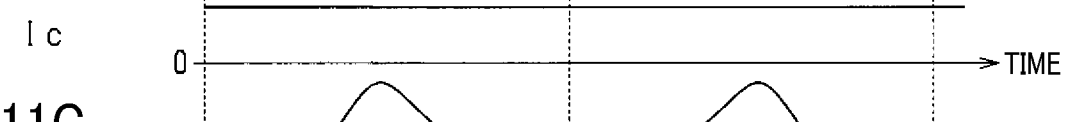
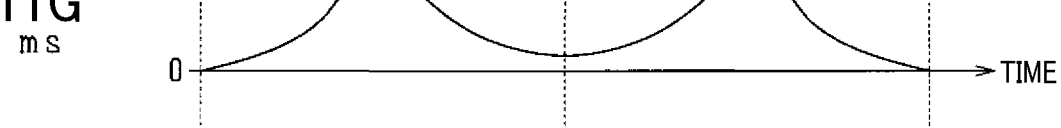
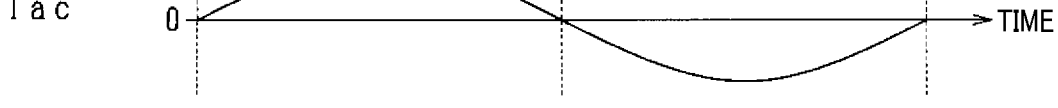

CONTROL APPARATUS FOR POWER CONVERTER

CROSS REFERENCE TO RELATED APPLICATION

This application is based on and claims the benefit of priority from Japanese Patent Application No. 2018-69527 filed on Mar. 30, 2018, the disclosure of which is incorporated in its entirety herein by reference.

TECHNICAL FIELD

The present disclosure relates to control apparatuses for a power converter.

BACKGROUND

There is known a control apparatus that controls on-off switching operations of each of switches in a known peak current mode to thereby adjust an inductor current, i.e. a reactor current, which flows through an inductor, i.e. a reactor, of a power converter based on an alternating current input to the power converter, to a current command.

SUMMARY

A control apparatus according to an aspect of the present disclosure is applicable to a power converter that includes an inductor and a switch connected to the inductor, and that converts one of an alternating-current voltage and a direct-current voltage input thereto into the other thereof.

The control apparatus includes a slope compensation unit configured to generate, based on an alternating-current voltage, a slope compensation signal having a slope that depends on the alternating-current voltage, and add the slope compensation signal to an inductor current.

The control apparatus includes a current controller configured to control on-off switching operations of the switch in a peak current mode to thereby cause the inductor current, to which the slope compensation signal has been added, to follow a sinusoidal command current that depends on the alternating-current voltage.

BRIEF DESCRIPTION OF THE DRAWINGS

Other aspects of the present disclosure will become apparent from the following description of embodiments with reference to the accompanying drawings in which:

FIG. 6 is a flowchart schematically illustrating a switch control routine carried out by the control apparatus according to the first embodiment;

FIGS. 7A to 7F are a joint timing chart schematically illustrating how the control apparatus works according to the first embodiment;

FIGS. 11A to 11I are a joint timing chart schematically illustrating how the control apparatus works according to the second embodiment;

DETAILED DESCRIPTION OF EMBODIMENT

Inventor's Viewpoint

Figure 1:
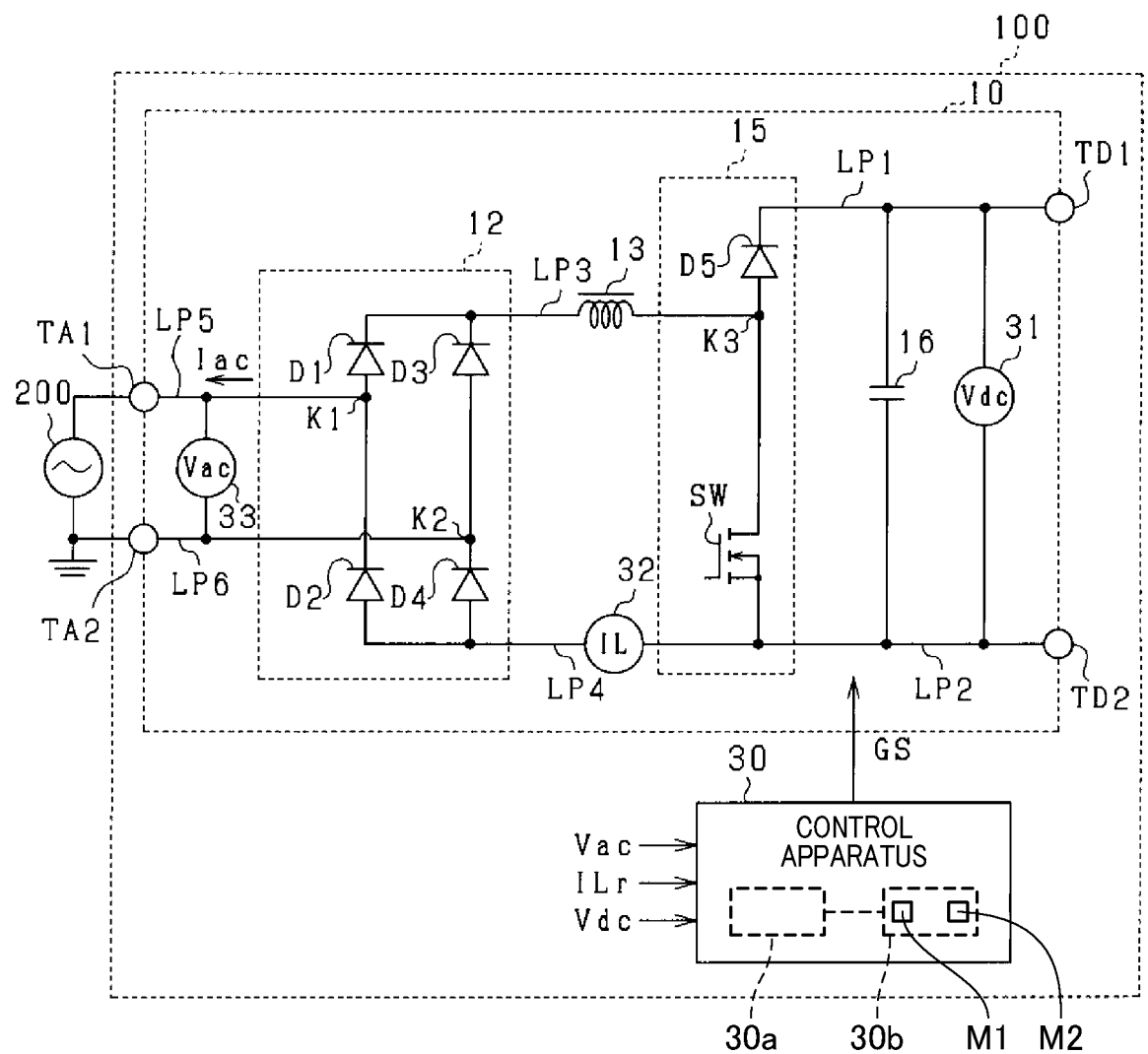
FIG. 1 is a circuit diagram schematically illustrating an example of the overall structure of a power conversion system according to the first embodiment of the present disclosure.

Japanese Patent Application Publication No. 2015-198460 discloses a control apparatus that controls on-off switching operations of each of switches in a known peak current mode to thereby adjust an inductor current, i.e. a reactor current, which flows through an inductor, i.e. a reactor, of a power converter based on an alternating current input to the power converter, to a current command. The control apparatus also adds, to the current command, a current correction that depends on the phase of an input alternating-current (AC) voltage, thus reducing distortion, i.e. harmonic distortion, in the waveform of the alternating current. Specifically, the control apparatus calculates an average of the inductor current over each switching period of the switches, and calculates a deviation of the average from a corresponding value of the current command for each switching period.

The control apparatus disclosed in the above published patent document calculates the deviation of the average from a corresponding value of the current command for each switching period, and uses the calculated deviation as the current correction for each switching period. This may cause the processing load of the control apparatus to be higher.

From this viewpoint, one aspect of the present disclosure seeks to provide control apparatuses for a power converter, each of which is configured to have a lower processing load for reducing a degree of distortion in the waveform of an alternating current input to or output from the power converter.

According to an exemplary aspect of the present disclosure, there is provided a control apparatus applicable to a power converter that includes an inductor and a switch connected to the inductor, and that converts one of an alternating-current voltage and a direct-current voltage input thereto into the other thereof. The control apparatus includes a current obtainer configured to obtain a current flowing through the inductor as an inductor current, and a voltage obtainer configured to obtain the alternating-current voltage. The control apparatus includes a slope compensation unit configured to generate, based on the alternating-current voltage obtained by the voltage obtainer, a slope compensation signal having a slope that depends on the alternating-current voltage, and add the slope compensation signal to the inductor current obtained by the current obtainer.

The control apparatus includes a current controller configured to control on-off switching operations of the switch in a peak current mode to thereby cause the inductor current, to which the slope compensation signal has been added, to follow a sinusoidal command current that depends on the alternating-current voltage.

Power converters, each of which controls on-off switching operations of a switch connected to an inductor in a peak current mode, may cause an inductor current flowing through the inductor to be deviated from its predetermined designed current, resulting in distortion in an alternating current input to or output from the power converter. Adjusting the inductor current to an appropriate value therefore enables the degree of distortion in the alternating current to be reduced.

Because a command current for the inductor current has a sinusoidally changes based on the alternating-current voltage, it is possible to use the alternating-current voltage as a parameter indicative of the inductor current.

In addition, in the peak current mode, changing the slope of a slope compensation signal to be added to the inductor current enables the duty factor, which represents a controllable ratio of the on-duration of the switch to each switching cycle, to change, making it possible to adjust the inductor current flowing through the inductor.

The inventors have focused on these relationships to thereby have found that adjustment of the inductor current enables distortion in the alternating current to be suppressed.

From this viewpoint, the current controller of the control apparatus according to the exemplary aspect is configured to control on-off switching operations of the switch in the peak current mode to thereby cause the inductor current, to which the slope compensation signal has been added, to follow a sinusoidal command current that depends on the alternating-current voltage. At that time, the slope of the slope compensation signal superimposed on the inductor current depends on the alternating-current voltage. This enables the slope of the slope compensation signal to change with change of the alternating-current voltage that is the parameter indicative of the inductor current, making it possible to suppress distortion in the alternating current.

This configuration of the control apparatus according to the exemplary aspect therefore enables the processing load of the control apparatus to be lower as compared with a processing load of a conventional apparatus that cyclically calculates the deviation of the average of the inductor current from a corresponding value of the current command, and uses the calculated deviation as the current correction for the inductor current.

EMBODIMENT

The following describes embodiments of the present disclosure with reference to the accompanying drawings. In the embodiments, like parts between the embodiments, to which like reference characters are assigned, are omitted or simplified to avoid redundant description.

First Embodiment

The following describes the first embodiment of the present disclosure with reference to FIGS. 1 to 8. A control apparatus 30 according to the present embodiment is embodied as a component of a power converter system 100 for converting an AC voltage into a direct-current (DC) voltage.

Referring to FIG. 1, the power converter system 100 includes an AC-DC converter 10 and the control apparatus 30.

The AC-DC converter 10 includes first and second AC terminals TA1 and TA2, and first and second DC terminals TD1 and TD2. The AC-DC converter 10 is connected to an AC power source 200 via the first and second AC terminals TA1 and TA2. The AC-DC converter 10 is also connected to at least one unillustrated DC load via the first and second DC terminals TD1 and TD2. A commercial power source can be used as the AC power source 200. The at least one DC load includes, for example, a DC power source, such as a battery, and/or a DC-DC converter.

The AC-DC converter 10 includes a full-bridge circuit 12, a half-bridge circuit 15, an inductor, i.e. a reactor, 13, a capacitor 16, and first to sixth wirings LP1 to LP6. Each of the first to sixth wirings LP1 to LP6 has opposing first and second ends.

The full-bridge circuit 12 includes first to fourth diodes D1 to D4. The anode of the first diode D1 is connected to the cathode of the second diode D2, and the anode of the third diode D3 is connected to the cathode of the fourth diode D4. The cathode of each of the first and third diodes D1 and D3 is connected to the first end of the third wiring LP3, and the anode of each of the second and fourth diodes D2 and D4 is connected to the first end of the fourth wiring LP4.

The connection point, which will be referred to as a first connection point K1, between the anode of the first diode D1 and the cathode of the second diode D2 is connected to the first end of the fifth wiring LP5, and the second end of the fifth wiring LP5 is also connected to the first AC terminal TA1.

The connection point, which will be referred to as a second connection point K2, between the anode of the third diode D3 and the cathode of the fourth diode D4 is connected to the first end of the sixth wiring LP6, and the second end of the sixth wiring LP6 is also connected to the second AC terminal TA2.

The half-bridge circuit 15 includes a fifth diode D5 and a switch SW. The first embodiment uses an N-channel MOSFET as the switch SW, which is an example of a voltage-controlled switch. The anode of the fifth diode D5 is connected to the drain of the switch SW. The cathode of the fifth diode D5 is connected to the first end of the first wiring LP1, and the second end of the first wiring LP1 is connected to the first DC terminal TD1. The source of the switch SW is connected to the first end of the second wiring LP2, and the second end of the second wiring LP2 is connected to the second DC terminal T2.

The connection point, which will be referred to as a third connection point K3, between the anode of the fifth diode D5 and the drain of the switch SW is connected to the second end of the third wiring LP3. The inductor 13 is mounted on the third wiring LP3. The source of the switch SW is connected to the second end of the fourth wiring LP4.

The capacitor 16 is connected between the first and second wirings LP1 and LP2 to be parallel to the series connection member comprised of the fifth diode D5 and the switch SW connected in series.

The power converter system 100 also includes a first voltage sensor 31, a current sensor 32, and a second voltage sensor 33. The first voltage sensor 31 is connected between the first wiring LP1 and the second wiring LP2, and configured to measure a voltage across the capacitor 16 as a DC voltage Vdc that is an output DC voltage of the AC-DC converter 10. The current sensor 32 is provided on the fourth wiring LP4, and configured to measure a current flowing through the inductor 13 as an inductor current ILr. The second voltage sensor 33 is connected between the fifth wiring LP5 and the sixth wiring LP6, and configured to measure a voltage across the AC power source 200 as an AC voltage Vac having a predetermined period T.

These measurements Vdc, ILr, and Vac are sent to the control apparatus 30.

The control apparatus 30 aims to cause the AC-DC converter 10 to output the output DC voltage Vdc whose value follows a target output DC voltage command Vdc*, which represents a target value for the output DC voltage Vdc, and can be input thereto from an external device, or can be previously stored therein.

The control apparatus 30 is connected to a control terminal, i.e. the gate, of the switch SW, and configured to control on-and off switching operations of the switch SW.

Figure 2:
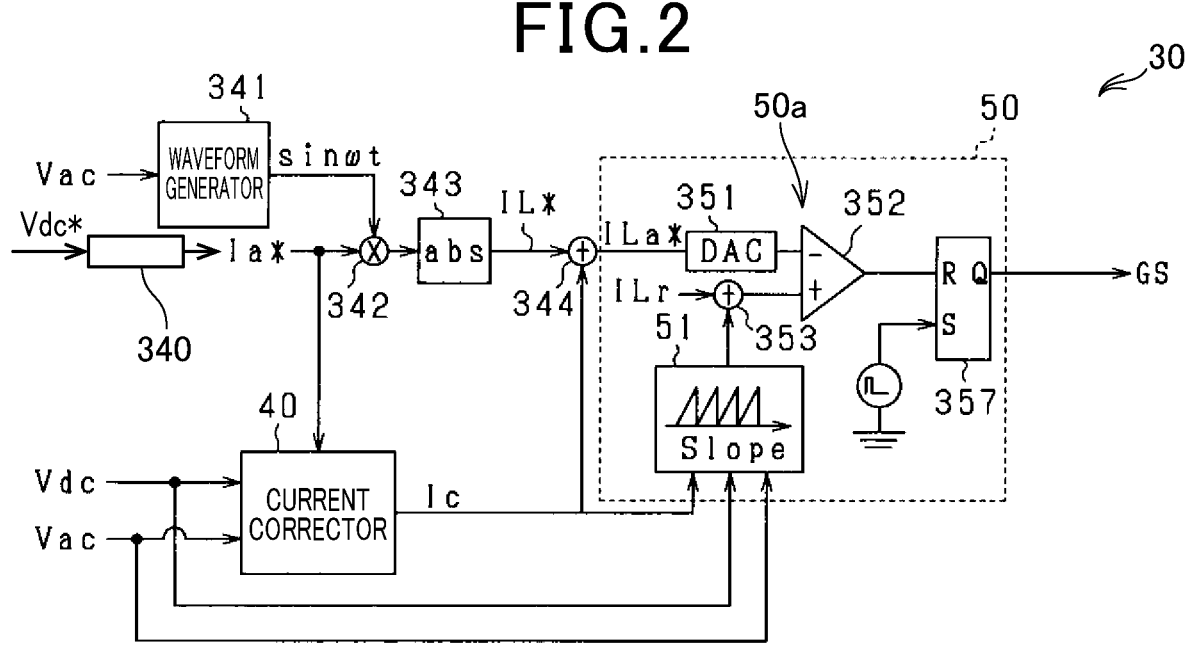
FIG. 2 is a circuitry block diagram schematically illustrating an example of the structure of a control apparatus illustrated in FIG. 1.

Next, the following describes in detail the functional structure of the control apparatus 30 with reference to FIG. 2.

Note that the control apparatus 30 is configured to, for example, manipulate information and/or data, such as measurement data items sent from the above sensors in digital data format.

The control apparatus 30 is configured to control close or open, i.e. switch on or off, the switch SW in a known peak current mode. For example, the control apparatus 30 functionally includes an amplitude command calculator 340, a waveform generator 341, a multiplier 342, an absolute value calculator 343, an adder 344, a current corrector 40, and a current control unit 50.

For example, the control apparatus 30 is comprised of at least one processor 30$a$ and at least one memory 30$b$, i.e. a data storage medium, such as a nonvoluntary storage medium. The at least one processor 30$a$ can incorporate therein the at least one memory 30$b$.

All the functions or functional components, which include the functional components 340 to 344, 40, and 50, provided by the control apparatus 30 can be implemented by the at least one processor 30$a$; the at least one processor 30$a$ can be comprised of (1) The at least one programmable processing unit, i.e. at least one programmable logic circuit (2) At least one hardwired logic circuit (3) At least one hardwired-logic and programmable-logic hybrid circuit The amplitude command calculator 340 calculates an amplitude command Ia* for the amplitude of the inductor current ILr in accordance with, for example, the voltage command Vdc* for the output DC voltage Vdc.

The waveform generator 341 generates a reference waveform, i.e. a sinusoidal reference waveform, sin $\omega t$ that represents how the AC voltage Vac is changed for each half period (T/2); $\omega$ represents the angular velocity of the AC voltage Vac.

For example, the waveform generator 341 detects each time of zero-crossing of the AC voltage Vac measured by the second voltage sensor 33 as a zero-crossing point. That is, the waveform generator 341 sequentially detects adjacent zero-crossing points of the AC voltage Vac, and sets an interval between the adjacent zero-crossing points as the half period (T/2) of the AC voltage Vac. Then, the waveform generator 341 calculates the angular velocity $\omega$ of the AC voltage Vac in accordance with the following equation "$\omega=2\pi\times(1/T)$", and sets an angular velocity of a sinusoidal waveform having an amplitude of 1 to the calculated angular velocity $\omega$, thus generating the reference waveform sin $\omega t$ with the same phase as the phase of the AC voltage Vac.

The multiplier 342 multiplies the amplitude command Ia* obtained by the amplitude command calculator 340 and the reference waveform sin $\omega t$ by each other, thus outputting a multiplication result expressed by "Ia*×sin $\omega t$". The absolute value calculator 343 calculates an absolute value of the multiplication result "Ia*×sin $\omega t$" to thereby calculate a value |Ia*×sin $\omega t$| as a pre-correction command current IL*.

The pre-correction command current IL*, which is expressed by |Ia*×sin ωt|, corresponds to, for example, a command for the inductor current ILr.

The current corrector 40 sets a current correction Ic for correcting the pre-correction command current IL*. The current correction Ic represents a correction value for reducing a degree of distortion in the AC voltage Vac. How the current corrector 40 sets the current correction Ic is described in detail later.

The adder 344 adds the pre-correction command current IL*, which is expressed by |Ia*×sin ωt|, to the current correction Ic to thereby set the addition result, which is expressed by (|Ia*×sin ωt|+Ic), as a corrected command current ILa*.

The current control unit 50 determines a gate signal GS for the switch SW for on-off control of the switch SW in accordance with the inductor current ILr measured by the current sensor 32, and the corrected command current ILa*, and outputs the gate signal GS to the switch SW, thus controlling on-off switching operations of the switch SW. For example, the current control unit 50 determines, based on the inductor current ILr and the corrected command current ILa*, the gate signal GS in the known peak current mode.

For example, the current control unit 50 includes a digital-to-analog (D/A) converter 351, a comparator 352, an adder 353, an RS flipflop 357, and a slope compensator 51. The D/A converter 351, comparator 352, adder 353, and RS flipflop 357 serve as, for example, a current controller 50a. The current corrector 40 and the slope compensator 51 serves as, for example, a slope compensation unit.

The comparator 352 has a non-inverting input terminal, an inverting input terminal, and an output terminal.

The D/A converter 351 converts the corrected command current ILa*, which has a digital signal format, into the corrected command current ILa*, which has an analog signal format, and inputs the corrected command current ILa*, which has the analog signal format, to the non-inverting input terminal of the comparator 352.

The slope compensator 51 generates a slope compensation signal Slope in accordance with the AC voltage Vac, the DC voltage Vdc, and the current correction Ic, and outputs the slope compensation signal Slope to the adder 353. The slope compensation signal Slope has a variable slope ms, and is configured to compensate for increasing and decreasing slopes of the inductor current ILr to thereby reduce oscillation of the inductor current ILr. How the slope compensator 51 generates the slope compensation signal Slope will be described in detail later.

The adder 353 adds the slope compensation signal Slope to the inductor current ILr, that is, calculates the sum of the slope compensation signal Slope and the inductor current ILr. Then, the adder 353 inputs the sum (Slope+ILr) of the slope compensation signal Slope and the inductor current ILr to the non-inverting input terminal of the comparator 352. The sum (Slope+ILr) of the slope compensation signal Slope and the inductor current ILr will be referred to as a slope-corrected inductor current (Slope+ILr).

The flipflop 357 has a reset terminal (R), a set terminal (S), and an output terminal (Q).

The comparator 352 compares the corrected command current ILa* input to the inverting input terminal with the slope-corrected inductor current (Slope+ILr) input to the non-inverting input terminal to thereby output a high-level signal, which is, for example, a predetermined high voltage signal, to the reset terminal R of the flipflop 357 while the slope-corrected inductor current (Slope+ILr) is lower than the corrected command current ILa*.

Additionally, the processor 30a is configured to input a predetermined clock, that is, regular clock pulses, to the set terminal S of the flipflop 357. The cycle of the clock pulses of the clock will be referred to as a clock cycle Tsw. The output terminal Q of the flipflop 357 is connected to the gate of the switch SW.

Figure 5:
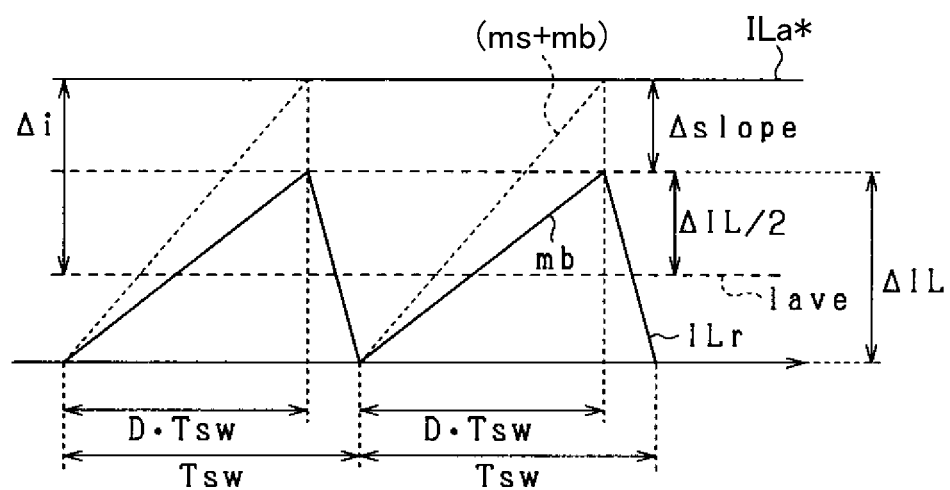
FIG. 5 is a diagram schematically illustrating a deviation range parameter according to the first embodiment.

That is, when a present clock pulse of the clock rises, a high-voltage signal is output from the flipflop 357 to the gate of the switch SW as the gate signal GS with a high voltage level indicative of an on command, so that the switch SW is turned on, and the inductor current ILr increases at a predetermined increasing slope mb (see FIG. 5).

While the slope-corrected inductor current (Slope+ILr) is lower than the corrected command current ILa*, the on state of the switch SW is maintained. When the slope-corrected inductor current (Slope+ILr) becomes identical to the corrected command current ILa*, the high-voltage signal is input to the reset terminal R of the flipflop 357, so that a low-voltage signal is output from the flipflop 357 to the gate of the switch SW as the gate signal GS with a low voltage level indicative of an off command. This results in the switch SW being turned off, and the inductor current IL decreasing at a predetermined decreasing slope ma (see FIG. 5).

Note that the decreasing slope ma of the inductor current ILr represents the rate of decrease of the inductor current ILr over time, so that the greater the absolute value of the decreasing slope ma of the inductor current ILr over time is, the more steeply the inductor current ILr decreases over time.

That is, the clock cycle serves as a switching cycle of the switch SW, and for each switching cycle, a duration for which the slope-corrected inductor current (Slope+ILr) is lower than the corrected command current ILa* is defined as an on-duration Ton of the switch SW.

This therefore enables, for each clock cycle (switching cycle) Tsw, the on-duration Ton of the switch SW to be adjusted while preventing the slope-corrected inductor current (Slope+ILr) from exceeding the corrected command current ILa*.

That is, the current control unit 50 controls, in the peak current mode, the slope-corrected inductor current (Slope+ILr) to be equal to or lower than the corrected command current ILa* as a peak of the slope-corrected inductor current (Slope+ILr).

Next, the following describes how the power converter system 100 operates.

The current control unit 50 controls the switch SW in the peak current mode to output the gate signal GS with the high voltage level to the gate of the switch SW, thus closing the switch SW. This provides a closed loop including the inductor 13, the switch SW, and the full-bridge circuit 12.

In the closed loop, an alternating current Iac input from the AC power source 200 to the AC input terminals TA1 and TA2 is rectified by the full-bridge circuit 12, so that the inductor current ILr flows through the inductor 13 while linearly increasing at the increasing slope mb (see FIG. 5). This enables magnetic energy to be charged in the inductor 13.

The current control unit 50 controls the switch SW in the peak current mode to output the gate signal GS with the low voltage level to the gate of the switch SW, thus opening the switch SW. The magnetic energy charged in the inductor 13 causes a direct current to flow through the fifth diode D5 to the first DC terminal TD1 with an aid of a smoothing operation of the capacitor 16, so that the inductor current ILr linearly decreases at the decreasing slope ma (see FIG. 5).

That is, the inductor current ILr linearly increases and thereafter linearly decreases in the form of a triangular waveform for each switching cycle Tsw (see FIG. 5).

Figure 3A:
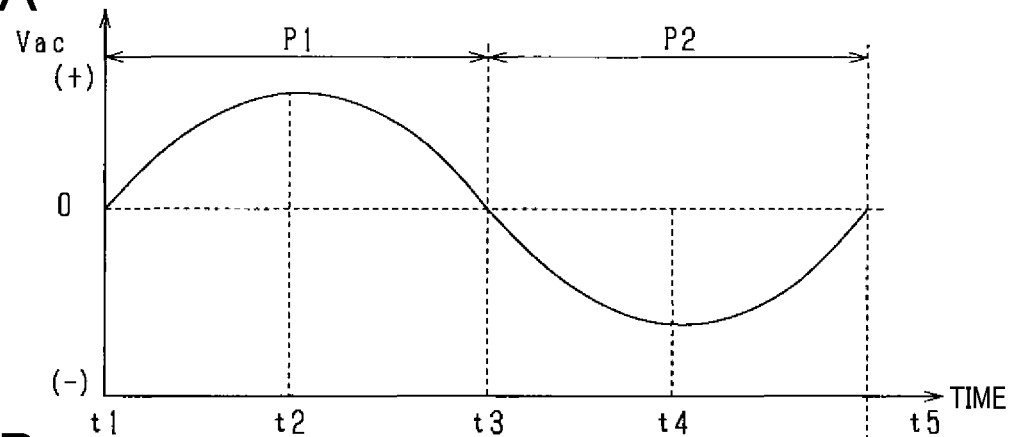
FIGS. 3A to 3D are a joint timing chart schematically illustrating an inventive concept of the first embodiment.
Figure 3B:
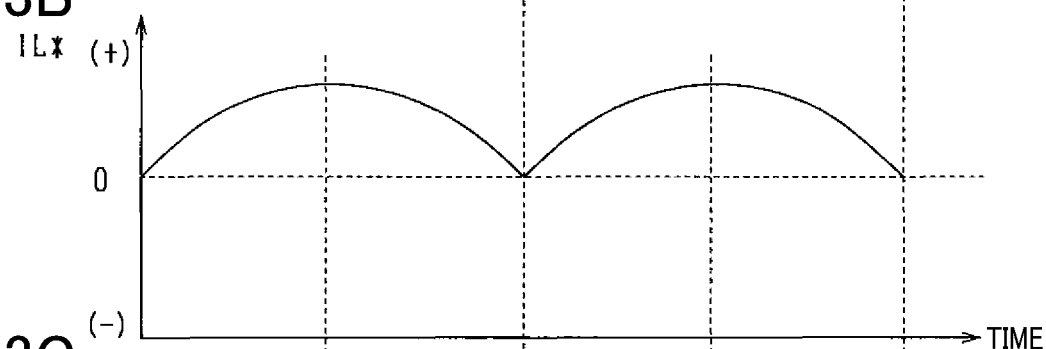
Figure 3C:
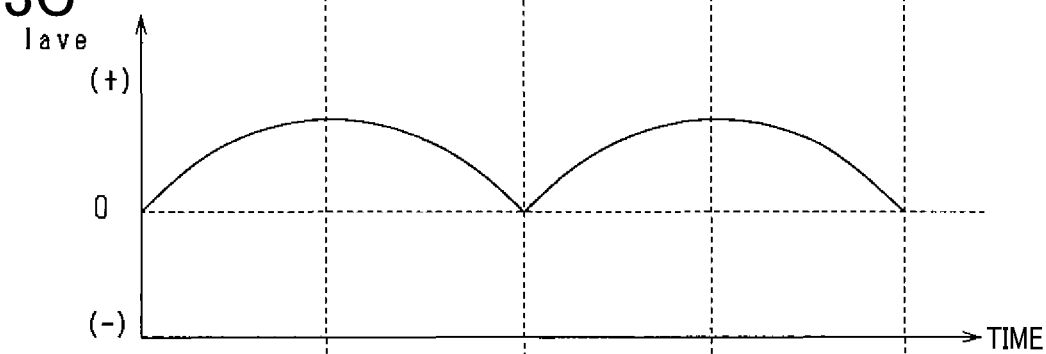
Figure 3D:
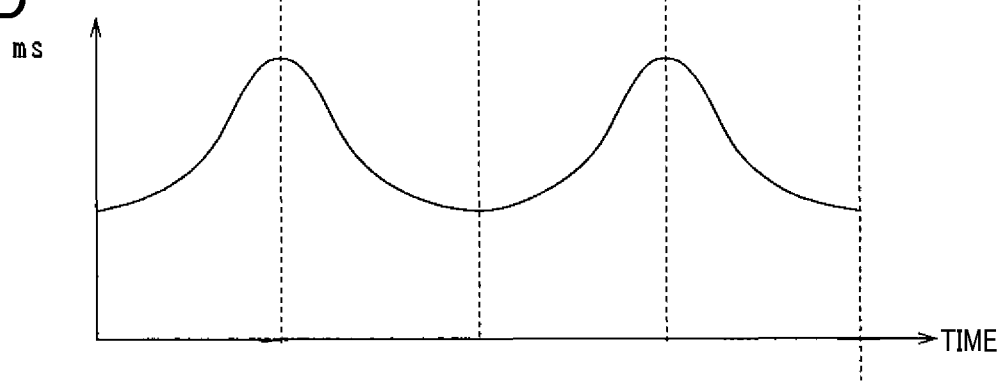

FIG. 3A schematically illustrates how the AC voltage Vac is changed over time, and FIG. 3B schematically illustrates how the pre-correction command current IL* is changed over time. FIG. 3C schematically illustrates how an average Iave of the inductor current ILr is changed over time assuming that no distortions are contained in the inductor current ILr, and FIG. 3D schematically illustrates how the variable slope ms of the slope compensation signal Slope is changed over time.

FIGS. 3A and 3B show that the pre-correction command current IL* is changed such that a positive half of a sinusoidal wave appears for each half (T/2) of the period T of the AC voltage Vac. FIG. 3C show that the average Iave of the inductor current ILr with no distortions therein is changed such that a positive half of a sinusoidal wave appears for each half (T/2) of the period T of the AC voltage Vac, which is similar to the pre-correction command current IL*.

Distortion, i.e. harmonic distortion, may be actually contained in the inductor current ILr. This may cause the waveform of the average Iave of the inductor current ILr to be changed from the normal waveform of the Iave illustrated in FIG. 3C. A distorted inductor current ILr may result in the input alternating current Iac.

From this viewpoint, the control apparatus 30 is configured to adjust the inductor current ILr to thereby reduce a degree of distortion in the alternating current Iac.

Because the pre-correction current IL* is changed in synchronization with the AC voltage Vac, the control apparatus 30 can use the AC voltage Vac as a parameter indicative of the phase of the inductor current ILr. As illustrated in FIG. 5, changing the slope ms of the slope compensation signal Slope in a present switching cycle Tsw enables a duty factor or a duty cycle, which represents a controllable ratio, i.e. percentage, of the on-duration Ton of the switch SW to the present switching cycle Tsw, to be changed, resulting in the inductor current ILr being changed.

For example, reducing the slope ms of the slope compensation signal Slope in a present switching cycle Tsw causes the amount of compensation for the inductor current ILr to decrease, so that the duty factor increases, resulting in the inductor current ILr increasing. In contrast, increasing the slope ms of the slope compensation signal Slope in a present switching cycle Tsw causes the amount of compensation for the inductor current ILr to increase, so that the duty factor decreases, resulting in the inductor current ILr decreasing.

The inventors have focused on these relationships among the slope ms of the slope compensation signal Slope, the duty factor, and the inductor current ILr, and correspondingly have found an inventive concept that changing the slope ms of the slope compensation signal Slope enables a degree of distortion in the alternating current Iac to be reduced.

Specifically, the inventors have found that, if the AC voltage Vac is converted into the DC voltage Vdc, a deviation range parameter Δi indicative of how the pre-correction command current IL* is deviated from the average Iave of the inductor current ILr takes a smallest absolute value each time the AC voltage Vac reaches a corresponding one of zero-crossing points (see times t1, t3, and t5 in FIGS. 3B and 3C). In contrast, the inventors have found that, if the AC voltage Vac is converted into the DC voltage Vdc, the deviation range parameter Δi takes a largest value each time the AC voltage Vac is located close to a corresponding one of peaks (see times t2 and t4 in FIGS. 3A to 3C).

Based on the above finding, the control apparatus 30 is configured to control the slope compensation signal Slope such that the slope ms of the slope compensation signal Slope cyclically changes to (1) Take a local minimum value each time the AC voltage Vac reaches a corresponding one of the zero-crossing points (see times t1, t3, and t5 in FIGS. 3A and 3D)

(2) Take a local maximum value each time the AC voltage Vac reaches a corresponding one of the peaks (see times t2 and t4 in FIGS. 3A and 3D)

This configuration enables the inductor current ILr to have a larger value each time the AC voltage Vac reaches a corresponding one of the zero-crossing points, resulting in a reduction of a degree of distortion in the alternating current Iac.

As described above, the slope compensator 51 sets the slope ms of the slope compensation signal Slope for each period of the AC voltage Vac such that the slope ms has 1. A positive peak for each of a positive half period P1 and a negative half period P2 of the AC voltage Vac 2. A negative peak between the positive and negative half periods P1 and P2 of the AC voltage Vac (see FIG. 3D)

For example, the control apparatus 30 has a slope map M1 in data-table format, in mathematical expression format, and/or program format stored in, for example, the at least one memory 30b. The slope map M1 includes information indicative of a relationship among (1) Each of values of the slope ms of the slope compensation signal Slope (2) A corresponding one of combinations, each of which is comprised of a corresponding value of the AC voltage Vac, a corresponding value of the DC voltage Vdc, and a corresponding value of the current correction Ic That is, the slope compensator 51 refers to the slope map M1 for each switching cycle Tsw, and extracts, for the corresponding switching cycle Tsw, a value of the slope ms of the slope compensation signal Slope from the slope map M1; the extracted value of the slope ms in the slope map M1 correlates with a corresponding combination of a corresponding value of the AC voltage Vac, a corresponding value of the DC voltage Vdc, and a corresponding value of the current correction Ic.

Figure 4:
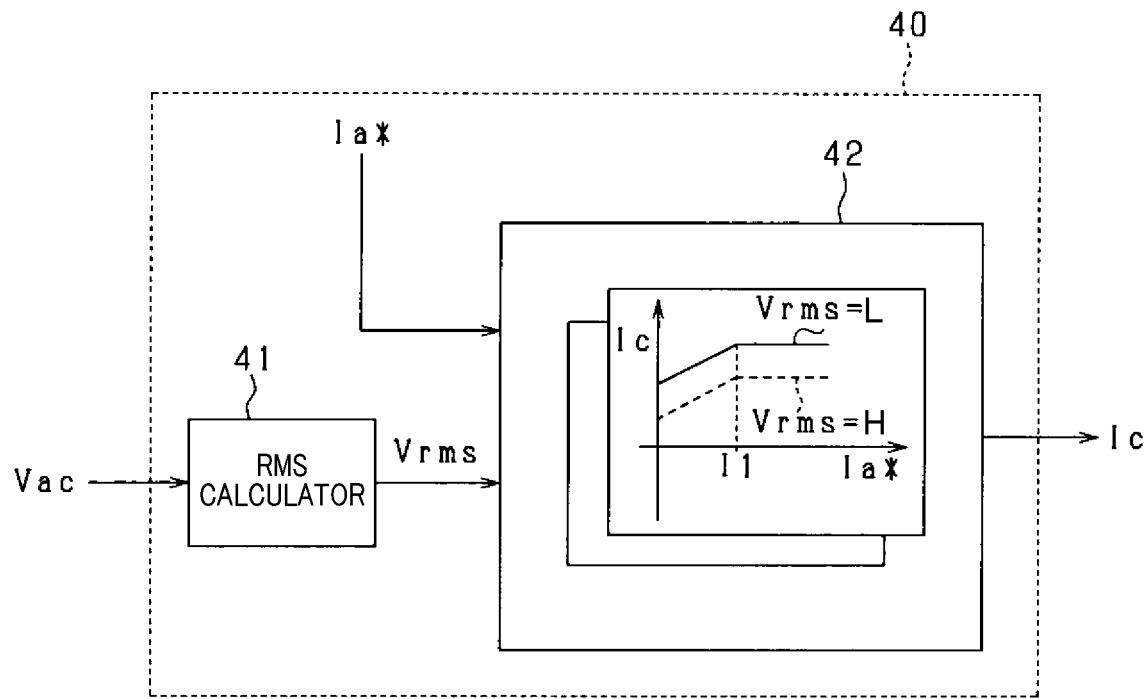
FIG. 4 is a block diagram schematically illustrating an example of the structure of a current corrector illustrated in FIG. 2.

Next, the following describes an example of the structure of the current corrector 40 with reference to FIG. 4.

The current corrector 40 sets a predetermined DC component as the current correction Ic for correcting the pre-correction command current IL*.

For example, as illustrated in FIG. 4, the current corrector 40 includes a root-mean-square (RMS) calculator 41 and a DC component setter 42.

The RMS calculator 41 calculates an RMS Vrms of the AC power source 200 based on the AC voltage Vac.

The DC component setter 42 sets, based on the RMS Vrms of the AC power source 200 and the amplitude command Ia*, the DC component as the current correction Ic. Note that the DC component setter 42 can be configured to calculate the current correction Ic based on the amplitude of the AC voltage Vac in place of the RMS Vrms of the AC power source 200.

The control apparatus 30 is configured to set the duty factor of the switch SW to be lower than a predetermined threshold duty of, for example, 0.5 (50%) for preventing subharmonic oscillations of the inductor current ILr. Because the absolute value of the decreasing slope ma of the inductor current ILr becomes steeper, i.e. greater, the duty factor of the switch SW becomes greater, and the control apparatus 30 is configured to maintain the absolute value of the decreasing slope ma to be equal to or smaller than an absolute value of a predetermined threshold slope, making it possible to prevent the subharmonic oscillations of the inductor current ILr.

Note that the decreasing slope ma of the inductor current ILr has a predetermined correlation with the absolute signal |Vac| of the AC voltage Vac rectified by the full-bridge circuit 12 and inputted to the inductor 13, and the DC voltage Vdc output from the inductor 13; this correlation can be expressed by the following equation (A):

$$ma = (Vdc - |Vac|)/L \qquad (A)$$

where reference character L represents an inductance of the inductor 13.

The smaller the absolute signal |Vac| of the AC voltage Vac, the larger the absolute value of the decreasing slope ma of the inductor current ILr, resulting in an increase of the duty factor of the switch SW. For this reason, for preventing the subharmonic oscillations of the inductor current ILr, it is necessary to increase the slope ms of the slope compensation signal SLope with decrease of the absolute signal |Vac| of the AC voltage Vac. In view of this necessity, the control apparatus 30 is configured to increase the current correction Ic with a decrease of the RMS Vrms of the AC power source 200.

Setting the amplitude command Ia* to be lower than a predetermined current threshold I1 for a selected switching cycle Tsw causes the inductor current ILr to operate in a discontinuous mode so that the inductor current ILr is interrupted in a period during the selected switching cycle Tsw. This results in the peak of the inductor current ILr that should be corrected by the current correction Ic in the discontinuous mode being lower than that in a continuous mode in which the inductor current ILr continuously flows with no interruption periods.

From this viewpoint, the DC component setter 42 is configured to set the current correction Ic to be lower as the amplitude command Ia* becomes lower while the amplitude command Ia* is equal to or less than the current threshold I1.

This configuration prevents excessive correction of pre-correction command current IL* to thereby prevent the inductor current ILr flowing through the inductor 13 from becoming an overcurrent.

Note that the DC component setter 42 can be configured to set the current correction Ic at a constant DC level in the continuous mode in which the amplitude command Ia* is more than the current threshold I1.

For example, the control apparatus 30 has a DC component map M2 in data-table format, in mathematical expression format, and/or program format stored in, for example, the at least one memory 30b. The DC component map M2 includes information indicative of a relationship among (1) Values of the RMS Vrms, such as values of the RMS Vrms for respective various countries, of the AC voltage Vac (2) Corresponding values of the amplitude command Ia*

(3) Corresponding values of the current correction Ic

That is, the DC component setter 42 refers to the DC component map M2 for each switching cycle Tsw, and extracts, for the corresponding switching cycle Tsw, a value of the current correction Ic, i.e. the DC component, from the DC component map M2; the extracted value of the current correction Ic correlates with a corresponding value of the amplitude command Ia* and a corresponding value of the RMS Vrms of the AC power source 200.

Next, the following describes an example of a method of generating the slope map M1 indicative of the slope ms and the combination of the AC voltage Vac, the DC voltage Vdc, and the current correction Ic in accordance with FIG. 5.

As described above, the deviation range parameter Δi is defined a parameter indicative of how the pre-correction command current IL* is deviated from the average Iave of the inductor current ILr. For this reason, the deviation range parameter Δi relative to the average Iave of the inductor current ILr is represented, for each switching cycle Tsw, as the sum of a maximum inductor-current increment ΔIL relative to the average Iave of the inductor current ILr, which is referred to as (ΔIL/2), and a maximum slope-signal increment ΔSlope (see FIG. 5). The maximum inductor-current increment ΔIL represents a maximum increment of the inductor current ILr for each switching cycle Tsw, and the slope-signal increment ΔSlope represents a maximum increment of the slope compensation signal Slope.

This therefore enables the deviation range parameter Δi to be calculated based on the increasing slope mb of the inductor current ILr and the slope ms of the slope compensation signal Slope for each switching cycle Tsw in accordance with the following equation (1):

$$\Delta i = mb \times D \times \frac{Tsw}{2} + ms \times D \times Tsw \qquad (1)$$

where reference character D represents the duty factor of the switch SW.

Because the AC-DC converter 10 is configured to convert the AC voltage Vac into the DC voltage Vdc, the duty factor D for the switch SW can be expressed by the following equation (2a):

$$D = 1 - \frac{|Vac|}{Vdc} \qquad (2a)$$

In addition, the increasing slope mb of the inductor current ILr has a predetermined correlation with the absolute signal |Vac| of the AC voltage Vac rectified by the full-bridge circuit 12 and inputted to the inductor 13; this correlation can be expressed by the following equation (2b), because the absolute signal |Vac| of the AC voltage Vac flows in the closed loop:

$$mb = |Vac|/L \qquad (2b)$$

Assigning the equations (2a) and (2b) to the equation (1) enables the following equation (3) to be derived:

$$\Delta i = \frac{|Vac|}{2L} \cdot \left(1 - \frac{|Vac|}{Vdc}\right) \cdot Tsw + ms \cdot \left(1 - \frac{|Vac|}{Vdc}\right) \cdot Tsw \qquad (3)$$

Setting the current correction Ic to the deviation range parameter Δi and controlling, using the corrected command current ILa*, the switch SW in the peak current mode enable a degree of distortion in the alternating current Iac to be reduced. That is, replacing the deviation range parameter Δi with the current correction Ic in the equation (3) enables the current correction Ic, which reduces a degree of distortion in the alternating current Iac, to be calculated. Based on the current correction Ic and the equation (3), the slope ms of the slope compensation signal Slope can be calculated in accordance with the following equation (4):

$$ms = \frac{Ic - \frac{|Vac| \cdot \left(1 - \frac{|Vac|}{Vdc}\right) \cdot Tsw}{2L}}{\left(1 - \frac{|Vac|}{Vdc}\right) \cdot Tsw} \tag{4}$$

That is, the control apparatus 30 has performed a preprocessing routine to calculate, in accordance with the equation (4), a value of the slope ms of the slope compensation signal Slope for each switching cycle Tsw while changing a value of the AC voltage Vac within a predetermined allowable range to thereby change a value of the DC voltage Vdc, and changing a value of the current correction Ic within a predetermined range. Then, the control apparatus 30 has stored the calculated values of the slope ms in the at least one memory 30b such that each of the values of the slope ms correlate with (1) A corresponding value of the AC voltage Vac
(2) A corresponding value of the DC voltage Vdc
(3) A corresponding value of the current correction Ic This enables the slope map M1 to be generated in the at least one memory 30b.

Next, the following describes a switch control routine carried out by the control apparatus 30 every predetermined control period that matches with the switching cycle Tsw with reference to FIG. 6.

When starting a present cycle of the switch control routine, the control apparatus 30 serves as, for example, a current obtainer to obtain a value of the inductor current ILr measured by the current sensor 32 in step S10. Next, the control apparatus 30 serves as, for example, an AC voltage obtainer to obtain a value of the AC voltage Vac measured by the second voltage sensor 33 in step S11.

Subsequently, the control apparatus 30 multiplies the amplitude command Ia* by the reference waveform sin ωt of the AC voltage Vac, thus calculating a value of the pre-correction command current IL* in step S12.

Next, the control apparatus 30 calculates the RMS of the AC power source 200 in accordance with the AC voltage Vac in step S13, and sets, based on the RMS of the AC power source 200 and the amplitude command Ia*, a value of the current correction Ic using the DC component map M2 in step S14.

Following the operation in step S14, the control apparatus 30 adds the value of the current correction Ic to the pre-correction command current IL* to thereby set a value of the corrected command current ILa* in step S15.

In step S16, the control apparatus 30 sets a value of the slope ms of the inductor current ILr based on the value of the AC voltage Vac. Specifically, the control apparatus 30 extracts, from the slope map M2, a value of the slope ms of the inductor current ILr, which correlates with the value of the AC voltage Vac, a value of the DC voltage Vdc measured by the first voltage sensor 31, and the value of the current correction Ic in step S16.

Subsequently, in step S17, the control apparatus 30 controls the switch SW in the peak current mode in accordance with the corrected command current ILa* set in step S14 and the slope ms of the inductor current ILr set in step S16.

That is, when a present clock pulse of the clock rises, the current control unit 50 causes the flipflop 357 to output the high-voltage signal to the gate of the switch SW as the on command of the gate signal GS to thereby turn on the switch SW.

While the slope-corrected inductor current (Slope+ILr) is lower than the corrected command current ILa*, the current control unit 50 maintains the on command of the gate signal GS, thus maintaining the on state of the switch SW.

When the slope-corrected inductor current (Slope+ILr) becomes identical to the corrected command current ILa*, the current control unit 50 causes the high-voltage signal to be input to the reset terminal R of the flipflop 357, thus outputting the low-voltage signal from the flipflop 357 to the gate of the switch SW as the off command of the gate signal GS, thus turning off the switch SW.

This enables the inductor current ILr to flow through the inductor 13 while distortion contained in the alternating current Iac is suppressed.

After the operation in step S17, the control apparatus 30 terminates the present cycle of the switch control routine, and thereafter performs the next cycle of the switch control routine to thereby turning on and off the switch SW based on the duty factor D. That is, cyclic execution of the switch control routine enables the switch SW to be cyclically turned on and off based on the duty factor D in the peak current mode.

The following describes how the control apparatus 30 works, and also describes technical benefits achieved by the control apparatus 30.

FIG. 7A schematically illustrates how the AC voltage Vac and the DC voltage Vdc are changed over time, and FIG. 7B schematically illustrates how the gate signal GS is changed over time. FIG. 7C schematically illustrates how the current correction Ic is changed over time, and FIG. 7D schematically illustrates how the slope ms of the slope compensation signal Slope is changed over time. FIG. 7E schematically illustrates how the inductor current ILr is changed over time, and FIG. 7F schematically illustrates how the alternating current Iac is changed over time.

The control apparatus 30 is configured to change the slope ms of the slope compensation signal Slope in synchronization with change of the AC voltage Vac. Specifically, the control apparatus 30 cyclically changes the slope ms of the slope compensation signal Slope such that the slope ms takes (1) A local minimum value each time the AC voltage Vac reaches a corresponding one of the zero-crossing points (see times t11, t13, and t15 in FIGS. 7A and 7D)

(2) A local maximum value each time the AC voltage Vac reaches a corresponding one of the peaks (see times t12 and t14 in FIGS. 7A and 7D)

This configuration enables the duty factor D of the switch SW to have a larger value each time the AC voltage Vac reaches a corresponding one of the zero-crossing points (t11, t13, t15) as compared with a case where the slope ms is set to a constant value.

This configuration also enables the duty factor D of the switch SW to have a smaller value each time the AC voltage Vac reaches a corresponding one of the peaks (t12, t14) as compared with the case where the slope ms is set to a constant value.

This configuration enables the average Iave of the inductor current ILr to have a positive half of a sinusoidal wave for each half (T/2) of the period T of the AC voltage Vac, resulting in the input AC current Iac having a sinusoidal waveform with a suppressed distortion therein.

Figure 8A:
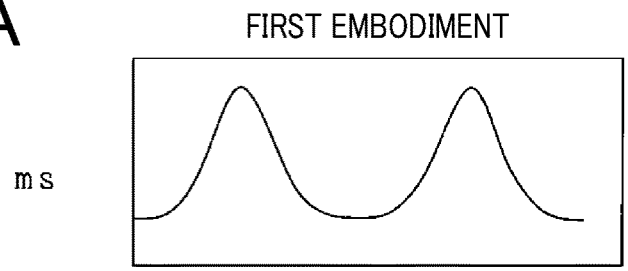
FIG. 8A is a graph schematically illustrating how a slope of a slope compensation signal is changed over time according to the first embodiment.
Figure 8B:
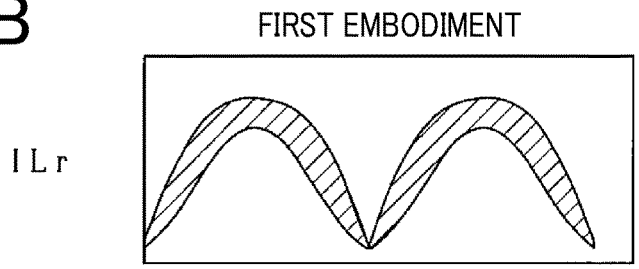
FIG. 8B is a graph schematically illustrating how an inductor current is changed over time according to the first embodiment.
Figure 8C:
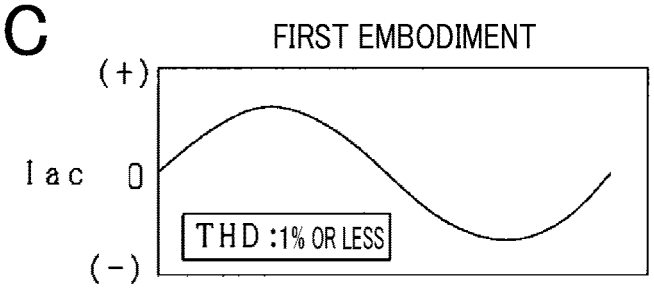
FIG. 8C is a graph schematically illustrating how an alternating current is changed over time according to the first embodiment.

FIGS. 8A, 8B, and 8C schematically illustrate how the slope ms of the slope compensation signal Slope, the inductor current ILr, and the alternating current Iac are respectively changed over time according to the first embodiment. In contrast, FIG. 8D schematically illustrates the slope ms of the slope compensation signal Slope, which is set to a constant value according to a first comparative example, and FIGS. 8E and 8F schematically illustrate how the inductor current ILr and the alternating current Iac are respectively changed over time according to the first comparative example.

Figure 8D:
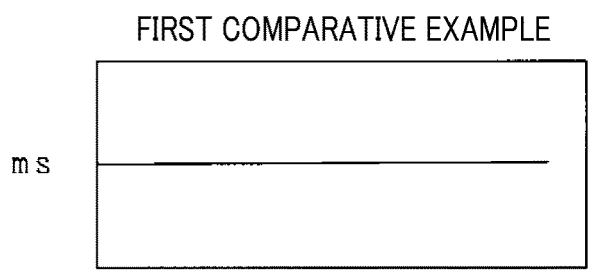
FIG. 8D is a graph schematically illustrating how the slope of the slope compensation signal is changed over time according to a first comparative example.
Figure 8E:
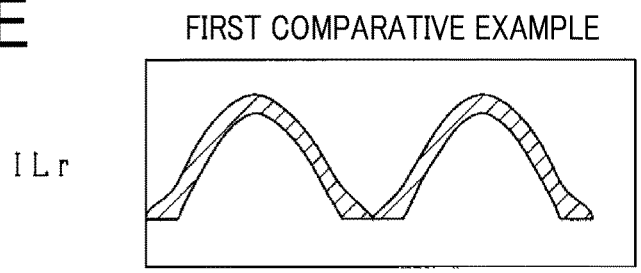
FIG. 8E is a graph schematically illustrating how the inductor current is changed over time according to the first comparative example.
Figure 8F:
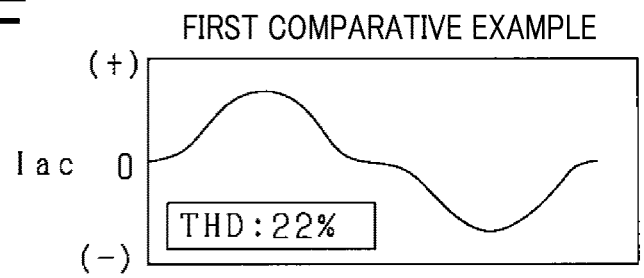
FIG. 8F is a graph schematically illustrating how the alternating current is changed over time according to the first comparative example.

Note that the conditions under which the peak current mode according to the first embodiment were carried out to obtain the characteristics illustrated in FIGS. 8A to 8C are set to be identical to those under which the peak current mode according to the first comparative example were carried out to obtain the characteristics illustrated in FIGS. 8D to 8E.

Note that, in each of FIGS. 8B and 8E, a hatched region of the corresponding inductor current ILr represents the range of ripples in the corresponding inductor current ILr.

A flow of the inductor current ILr illustrated in FIG. 8E through the inductor 13 according to the first comparative example results in the alternating current Iac being distorted at or around each of zero-crossing points. For example, the total harmonic distortion rate THD of the alternating current Iac according to the first comparative example is approximately 22%.

In contrast, a flow of the inductor current ILr illustrated in FIG. 8B through the inductor 13 according to the first embodiment results in a reduction of the degree of distortion in the alternating current Iac at or around each of zero-crossing points. For example, the total harmonic distortion rate THD of the alternating current Iac according to the first embodiment is equal to or less than 1%.

As described above, the control apparatus 30 of the first embodiment is configured to control on-off switching operations of the switch SW in the peak current mode such that the slope-corrected inductor current (Slope+ILr) is maintained to be equal to or lower than the corrected command current ILa*. In the peak current mode, the control apparatus 30 is specially configured to change the slope ms of the slope compensation signal Slope to be added to the inductor current ILr for each switching cycle Ysw such that the slope ms is synchronized with the AC voltage Vac.

This configuration enables the slope ms, which is changed in synchronization with the AC voltage Vac, to reduce a degree of distortion in the alternating current Iac input to the AC-DC converter 10. This configuration reduces a processing load of the control apparatus 30 to be lower than a processing load of the control apparatus 30 whose comparative configuration calculates a value of the deviation range parameter Δi for each switching cycle Tsw and uses the calculated value of the deviation range parameter Δi as the current correction for the inductor current ILr for each switching cycle Tsw.

The control apparatus 30 of the first embodiment is configured to add the current correction Ic to the pre-correction command current IL* to thereby correct the pre-correction command current IL* to the corrected current command ILa*, and change the slope ms of the slope compensation signal Slope in accordance with the AC voltage Vac and the current correction Ic.

This configuration therefore enables the inductor current ILr to be adjusted based on the corrected current command ILa*, making it possible to further suppress distortion in the alternating current Iac input to the input to the AC-DC converter 10.

The power control system 100 of the first embodiment is configured to convert the AC voltage Vac supplied from the AC power source 200 into the DC voltage Vdc, and the control apparatus 30 is configured to set the current correction Ic as a function of the RMS of the AC power source 200. Setting the slope ms of the slope compensation signal Slope in accordance with the current correction Ic for each switching cycle Tsw enables distortion in the alternating current Iac input to the AC-DC converter 10 to be suppressed while maintaining a value of the slope ms, which is required to prevent harmonic oscillations of the inductor current ILr, for each switching cycle Tsw.

The inventors have found that, if the AC voltage Vac is converted into the DC voltage Vdc, the deviation range parameter Δi indicative of how the pre-correction command current IL* is deviated from the average Iave of the inductor current ILr takes a largest value each time the AC voltage Vac reaches a corresponding one of zero-crossing points (see times t1, t3, and t5 in FIGS. 3B and 3C). In contrast, the inventors have found that, if the AC voltage Vac is converted into the DC voltage Vdc, the deviation range parameter Δi takes a smallest absolute value each time the AC voltage Vac is located close to a corresponding one of peaks (see times t2 and t4 in FIGS. 3A to 3C).

Based on the above finding, the control apparatus 30 is configured to control the slope compensation signal Slope for each period of the AC voltage Vac such that the slope ms has 1. A positive peak for each of the positive half period P1 and the negative half period P2 of the AC voltage Vac 2. A negative peak between the positive and negative half periods P1 and P2 of the AC voltage Vac (see FIG. 3D)

This configuration enables distortion in the alternating current Iac to be further suppressed.

Second Embodiment

Figure 9:
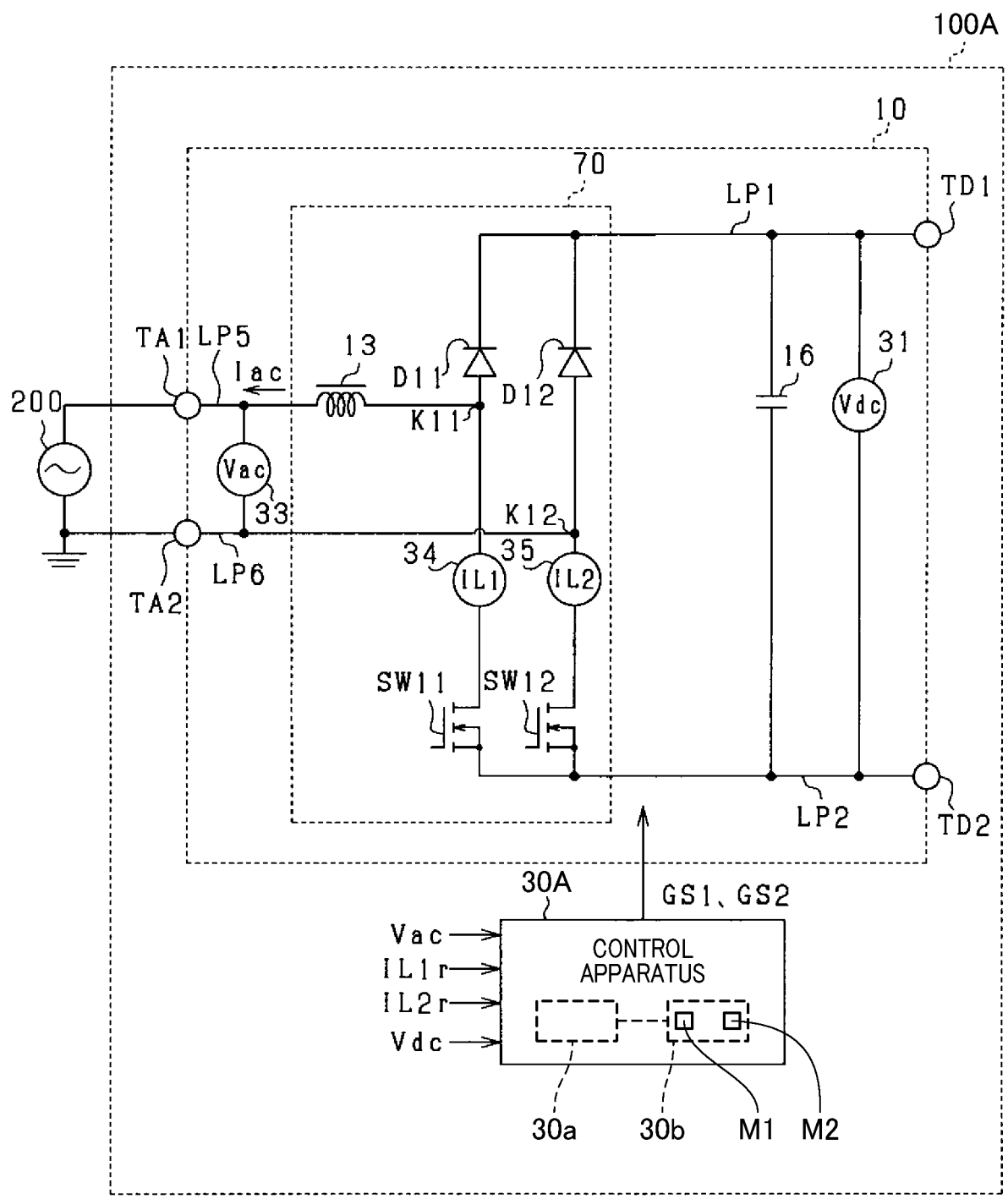
FIG. 9 is a circuit diagram schematically illustrating an example of the overall structure of a power conversion system according to the second embodiment of the present disclosure.

The following describes the second embodiment of the present disclosure with reference to FIGS. 9 to 13. FIG. 9 schematically illustrates a power converter system 100A according to the second embodiment. The structures and/or functions of the power converter system 100A according to the second embodiment are different from those of the power converter system 100 according to the first embodiment in the following points. So, the following mainly describes the different points, and omits or simplifies descriptions of like parts between the first and second embodiments, to which identical or like reference characters are assigned, thus eliminating redundant description.

The circuit structure of the power converter system 100A is different from the circuit structure of the power converter system 100.

Specifically, the power converter system 100A includes no half-bridge circuits.

FIG. 9 schematically illustrates the power converter system 100A. The power converter system 100A includes a full-bridge circuit 70. The full-bridge circuit 70 is connected to the first DC terminal TD1 via the first wiring LP1, and the full-bridge circuit 70 is connected to the second DC terminal TD2 via the second wiring LP2.

Specifically, the full-bridge circuit 70 includes first and second diodes D11 and D12, and first and second switches SW11 and SW12. The second embodiment uses an N-channel MOSFET as each of the first and second switches SW11 and SW12, which is an example of a voltage-controlled switch.

The anode of the first diode D11 is connected to the drain of the first switch SW11. The cathode of the first diode D11 is connected to the first end of the first wiring LP1, and the second end of the first wiring LP1 is connected to the first DC terminal TD1. The source of the first switch SW11 is connected to the first end of the second wiring LP2, and the second end of the second wiring LP2 is connected to the second DC terminal T2.

Similarly, the anode of the second diode D12 is connected to the drain of the second switch SW12. The cathode of the second diode D12 is connected to the first end of the first wiring LP1. The source of the second switch SW12 is connected to the first end of the second wiring LP2.

Each of the first and second switches SW11 and SW12 includes an intrinsic diode connected in antiparallel thereto.

The connection point, which will be referred to as a first connection point K11, between the anode of the first diode D11 and the drain of the first switch SW11 is connected to the first end of the fifth wiring LP5, and the second end of the fifth wiring LP5 is connected to the first AC terminal TA1. Similarly, the connection point, which will be referred to as a second connection point K12, between the anode of the second diode D12 and the drain of the second switch SW12 is connected to the first end of the sixth wiring LP6, and the second end of the sixth wiring LP6 is connected to the second AC terminal TA2.

The power converter system 100A also includes a control apparatus 30A and first and second current sensors 34 and 35. The first current sensor 34 is provided on a connection line between the anode of the first diode D11 and the drain of the first switch SW11. The first current sensor 34 is configured to measure a current flowing through the first switch SW11 as a first inductor current IL1$r$. The second current sensor 35 is provided on a connection line between the anode of the second diode D12 and the drain of the second switch SW12. The second current sensor 35 is configured to measure a current flowing through the second switch SW12 as a second inductor current IL2$r$.

Figure 10:
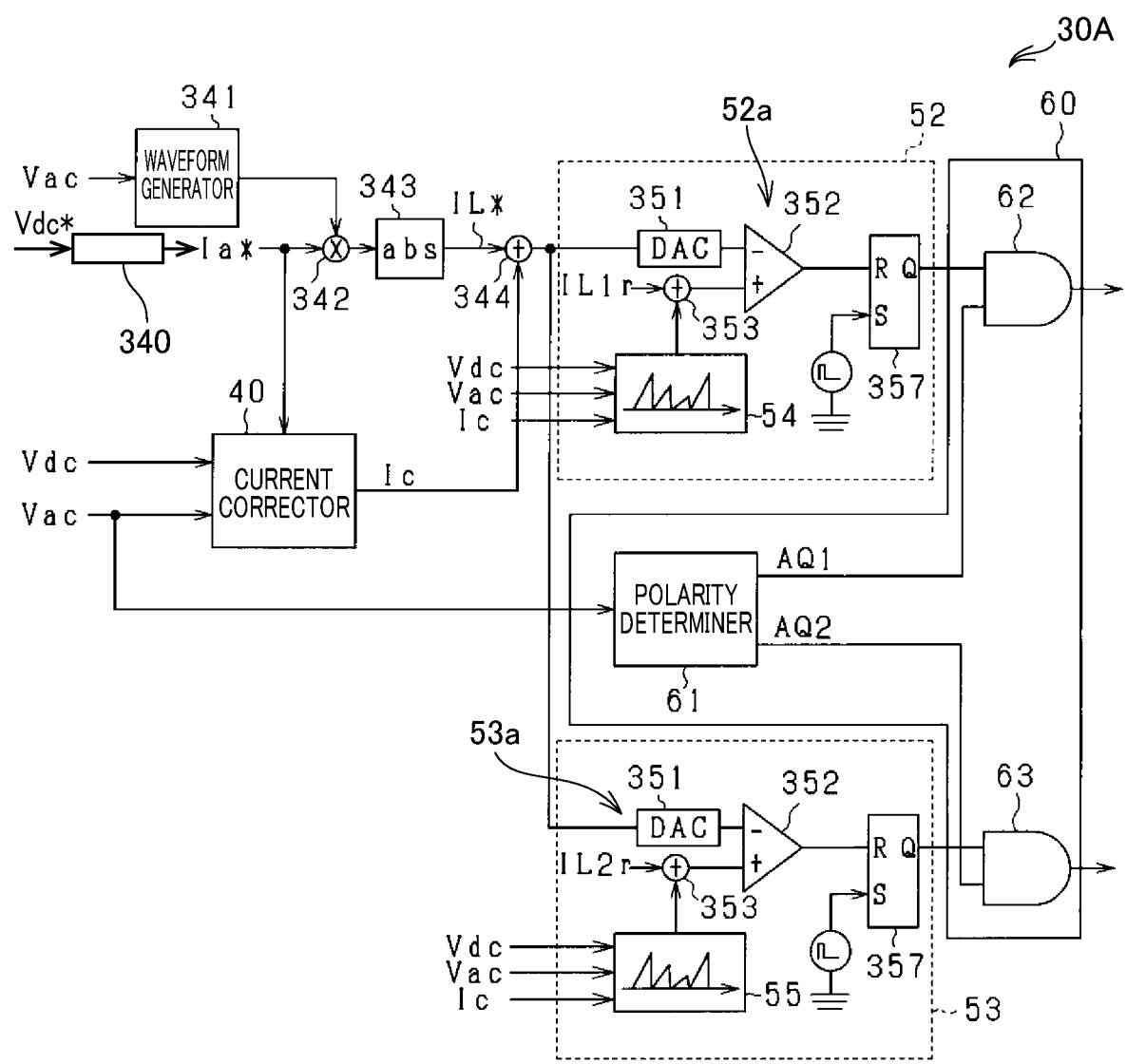
FIG. 10 is a circuitry block diagram schematically illustrating an example of the structure of a control apparatus illustrated in FIG. 9.

Next, the following describes in detail the functional structure of the control apparatus 30A with reference to FIG. 10.

The control apparatus 30A functionally includes a first current control unit 52, a second current control unit 53, and a selector 60 in place of the current control unit 50 as compared with the structure of the control apparatus 30.

The control apparatus 30A is configured to control closing or opening, i.e. switch on or off, each of the first and second switches SW11 and SW12 in the peak current mode to thereby adjust the first and second inductor currents IL1$r$ and IL2$r$, whose slopes have been compensated, to follow the corrected command current ILa*.

The first current control unit 52 determines a first gate signal GS1 for the first switch SW11 for on-off control of the first switch SW11 in accordance with the first inductor current IL1$r$ measured by the first current sensor 34, and the corrected command current ILa*, and outputs the first gate signal GS1 to the first switch SW11 via the selector 60, thus controlling on-off switching operations of the first switch SW11. For example, the first current control unit 52 determines, based on the first inductor current IL1$r$ and the corrected command current ILa*, the first gate signal GS1 in the known peak current mode.

Similarly, the second current control unit 53 determines a second gate signal GS2 for the second switch SW12 for on-off control of the second switch SW12 in accordance with the second inductor current IL2$r$ measured by the second current sensor 35, and the corrected command current ILa*, and outputs the second gate signal GS2 to the second switch SW12 via the selector 60, thus controlling on-off switching operations of the second switch SW12. For example, the second current control unit 53 determines, based on the second inductor current IL2$r$ and the corrected command current ILa*, the second gate signal GS2 in the known peak current mode.

For example, the first current control unit 52 includes a first slope compensator 54 in place of the slope compensator 51 as compared with the current control unit 50. Because the other components of the first current control unit 52 are identical to those of the current control unit 50, the description of them is omitted. Similarly, for example, the second current control unit 53 includes a second slope compensator 55 in place of the slope compensator 51 as compared with the current control unit 50. Because the other components of the second current control unit 53 are identical to those of the current control unit 50, the description of them is omitted. That is, the D/A converter 351, comparator 352, adder 353, and RS flipflop 357 of the first current control unit 52 serve as, for example, a first current controller 52$a$. Similarly, the D/A converter 351, comparator 352, adder 353, and RS flipflop 357 of the second current control unit 53 serve as, for example, a second current controller 53$a$. The current corrector 40, the first slope compensator 54, and the second slope compensator 55 serves as, for example, a slope compensation unit.

The first slope compensator 54 generates a first slope compensation signal Slope1 in accordance with the AC voltage Vac, the DC voltage Vdc, and the current correction Ic, and outputs the first slope compensation signal Slope1 to the adder 353 in the same manner as the slope compensator 51, so that the first slope compensation signal Slope1 is added to the first inductor current IL1$r$.

The second slope compensator 55 generates a second slope compensation signal Slope2 in accordance with the AC voltage Vac, the DC voltage Vdc, and the current correction Ic, and outputs the second slope compensation signal Slope2 to the adder 353 in the same manner as the slope compensator 51, so that the second slope compensation signal Slope2 is added to the second inductor current IL2$r$.

The selector 60 is configured to select one of the first gate signal GS1 and the second gate signal GS2 in accordance with the polarity of the AC voltage Vac, and output the selected one of the first gate signal GS1 and the second gate signal GS2 to the corresponding one of the gate of the first switch SW1 and the gate of the second switch SW2.

Specifically, the selector 60 includes a polarity determiner 61, a first AND circuit 62, and a second AND circuit 63.

Each of the first and second AND circuits 62 and 63 has first and second input terminals, and the polarity determiner 61 has first and second output terminals connected to the first input terminals of the respective first and second AND circuits 62 and 63. The second input terminal of the first AND circuit 62 is connected to the output terminal of the flipflop 357 of the first current control unit 52. The second input terminal of the second AND circuit 63 is connected to the output terminal of the flipflop 357 of the second current control unit 53.

The polarity determiner 61 is configured to determine whether the AC voltage Vac has a positive polarity or a negative polarity every predetermined cycle. The polarity determiner 61 is also configured to (1) Output, from the first output terminal, a first selection signal AQ1 with a high voltage level to the first input terminal of the first AND circuit 62, and output, from the second output terminal, a second selection signal AQ2 with a low voltage level to the first input terminal of the second AND circuit 63 upon determining that the AC voltage Vac has the positive polarity (2) Output, from the first output terminal, the first selection signal AQ1 with the low voltage level to the first input terminal of the first AND circuit 62, and output, from the second output terminal, the second selection signal AQ2 with the high voltage level to the first input terminal of the second AND circuit 63 upon determining that the AC voltage Vac has the negative polarity The first AND circuit 62 outputs the first gate signal GS1 to the gate of the first switch SW11 for opening or closing the first switch SW11, and the second AND circuit 63 outputs the second gate signal GS2 to the gate of the second switch SW12 for opening or closing the second switch SW12.

The following describes how the control apparatus 30A works, and also describes technical benefits achieved by the control apparatus 30A with reference to the joint timing chart of FIGS. 11A to 11I.

FIG. 11A schematically illustrates how the AC voltage Vac and the DC voltage Vdc are changed over time, FIG. 11B schematically illustrates how the first selection signal AQ1 is changed over time, and FIG. 11 FIG. 11C schematically illustrates how the second selection signal AQ2 is changed over time. FIG. 11D schematically illustrates how the first gate signal GS1 is changed over time, and FIG. 11D schematically illustrates how the second gate signal GS2 is changed over time.

FIG. 11E schematically illustrates how the current correction Ic is changed over time, and FIG. 11G schematically illustrates how the slope ms of the slope compensation signal Slope is changed over time. FIG. 11H schematically illustrates how the first inductor current IL1$r$ and the second inductor current IL2$r$, which alternately flow through the inductor 13 as an inductor current ILr, is changed over time, and FIG. 11I schematically illustrates how the alternating current Iac is changed over time.

The first selection signal AQ1 with the high voltage level and the second selection signal AQ2 with the low voltage level are input to the respective first and second AND circuits 62 and 63 during the positive half period P1 of the AC voltage Vac. This causes the first current control unit 52 to control the first switch SW11 in the peak current mode.

That is, when the present clock pulse of the clock rises, the first current control unit 52 causes the flipflop 357 to output the high-voltage signal to the gate of the first switch SW11 via the first AND circuit 62 as the on command of the first gate signal GS1 to thereby turn on the first switch SW11.

While the slope-corrected first inductor current (Slope+IL1$r$) is lower than the corrected command current ILa*, the first current control unit 52 maintains the on command of the first gate signal GS1, thus maintaining the on state of the first switch SW11.

During the on state of the first switch SW11 with the second switch SW12 being in the off state, the first inductor current IL1$r$ flows from the AC power source 33 through the inductor 13, the first switch SW11, and the intrinsic diode of the second switch SW12 in a closed loop. This enables magnetic energy to be charged in the inductor 13.

When the slope-corrected first inductor current (Slope+IL1$r$) becomes identical to the corrected command current ILa*, the first current control unit 52 causes the high-voltage signal to be input to the reset terminal R of the flipflop 357, thus outputting the low-voltage signal from the flipflop 357 to the gate of the first switch SW11 as the off command of the first gate signal GS1 via the first AND circuit 62, thus turning off the first switch SW11.

During the off state of the first switch SW11 with the second switch SW12 being in the off state, the first inductor current IL1$r$ flows from the AC power source 33 through the first diode D11, the DC load, and the intrinsic diode of the second switch SW12.

In particular, the first slope compensator 54 cyclically changes the slope ms of the first slope compensation signal Slope1 such that the slope ms takes (1) A local minimum value each time the AC voltage Vac reaches a corresponding one of the zero-crossing points (see times t21 and t23 in FIGS. 11A and 11G)

(2) A local maximum value each time the AC voltage Vac reaches a corresponding one of the peaks (see time t22 in FIGS. 11A and 11G)

This configuration enables the duty factor D of the first switch SW11 to have a larger value each time the AC voltage Vac reaches a corresponding one of the zero-crossing points (t21 and t23) as compared with a case where the slope ms is set to a constant value. This therefore results in distortion in the alternating current Iac input to the input to the AC-DC converter 10 being suppressed.

On the other hand, the first selection signal AQ1 with the low voltage level and the second selection signal AQ2 with the high voltage level are input to the respective first and second AND circuits 62 and 63 during the negative half period P2 of the AC voltage Vac. This causes the second current control unit 53 to control the second switch SW12 in the peak current mode.

That is, when the present clock pulse of the clock rises, the second current control unit 53 causes the flipflop 357 to output the high-voltage signal to the gate of the second switch SW12 via the second AND circuit 63 as the on command of the second gate signal GS2 to thereby turn on the second switch SW12.

During the on state of the second switch SW12 with the first switch SW11 being in the off state, the second inductor current IL2$r$ flows from the AC power source 33 through the inductor 13, the second switch SW12, and the intrinsic diode of the first switch SW11 in a closed loop. This enables magnetic energy to be charged in the inductor 13.

While the absolute of the slope-corrected second inductor current (Slope+IL2$r$) is lower than the magnitude of the corrected command current ILa*, the second current control unit 53 maintains the on command of the second gate signal GS2, thus maintaining the on state of the second switch SW12.

When the absolute of the slope-corrected second inductor current (Slope+IL2$r$) becomes identical to the corrected command current ILa*, the second current control unit 53 causes the high-voltage signal to be input to the reset terminal R of the flipflop 357, thus outputting the low-voltage signal from the flipflop 357 to the gate of the second switch SW12 as the off command of the second gate signal GS2 via the second AND circuit 63, thus turning off the second switch SW12.

During the off state of the second switch SW12 with the first switch SW11 being in the off state, the second inductor current IL2$r$ flows from the AC power source 33 through the second diode D12, the DC load, and the intrinsic diode of the first switch SW11.

In particular, the second slope compensator 55 cyclically changes the slope ms of the second slope compensation signal Slope2 such that the slope ms takes (1) A local minimum value when the AC voltage Vac reaches a corresponding zero-crossing point (see time t25 in FIGS. 11A and 11G)

(2) A local maximum value when the AC voltage Vac reaches a corresponding peak (see time t24 in FIGS. 11A and 11G)

This configuration enables the duty factor D of the second switch SW12 to have a larger value when the AC voltage Vac reaches a corresponding zero-crossing point t25 as compared with a case where the slope ms is set to a constant value. This therefore results in distortion in the alternating current Iac input to the input to the AC-DC converter 10 being suppressed.

As described above, the second embodiment achieves the same technical benefits as those achieved by the first embodiment.

First Modification of the Second Embodiment

Figure 12:
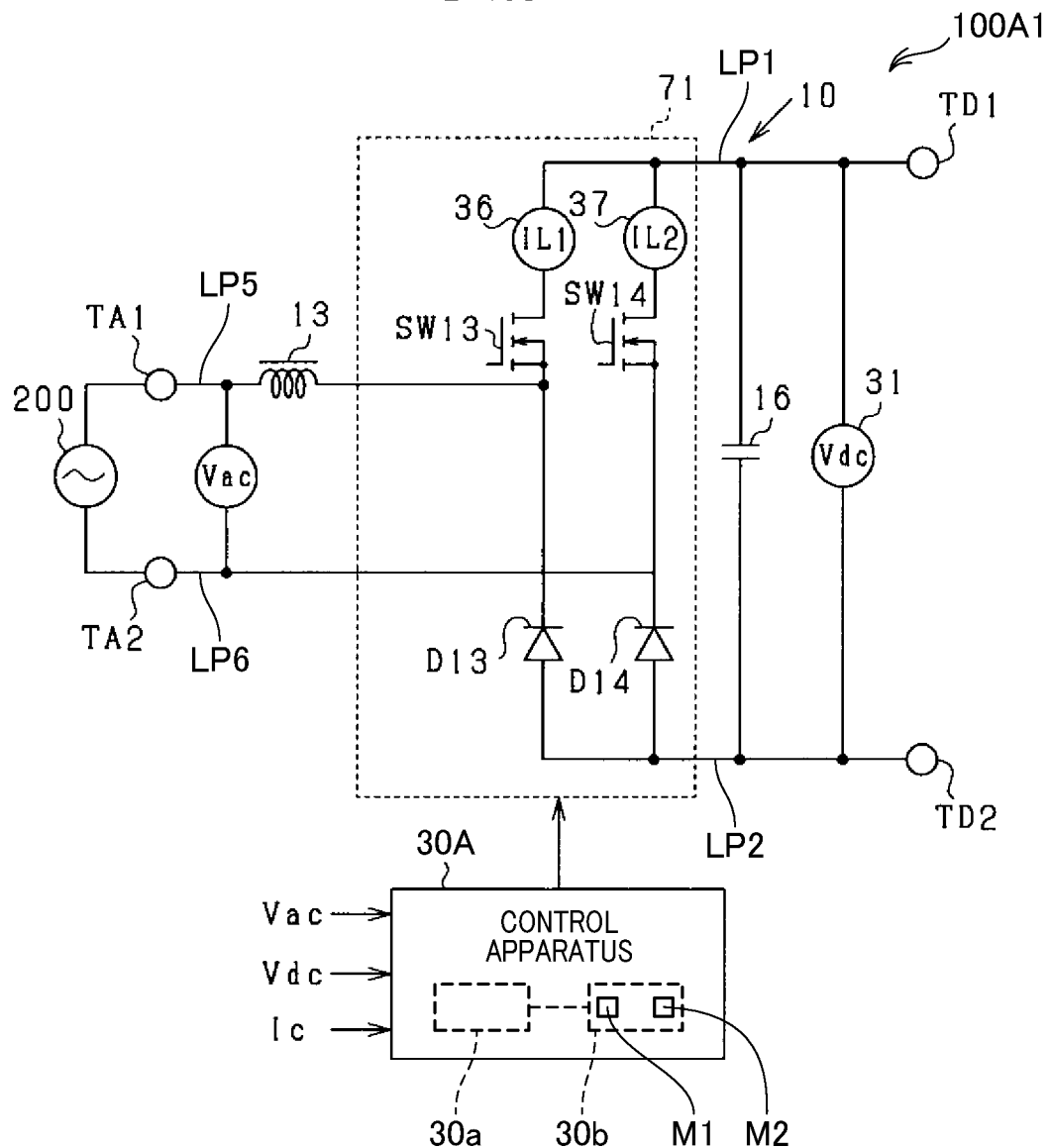
FIG. 12 is a circuit diagram schematically illustrating an example of the overall structure of a power conversion system according to a first modification of the second embodiment of the present disclosure.

FIG. 12 schematically illustrates a circuit structure of a power converter system 100A1 according to the first modification of the second embodiment.

The circuit structure of the power converter system 100A1 includes a full-bridge circuit 71 whose circuit structure is different from the circuit structure of the full-bridge circuit 70 of the second embodiment. The following mainly describes the different circuit structure, and omits or simplifies descriptions of like parts between the second embodiment and its first modification, to which identical or like reference characters are assigned, thus eliminating redundant description.

The full-bridge circuit 71 includes first and second diodes D13 and D14, and first and second switches SW13 and SW14. The first modification of the second embodiment uses an N-channel MOSFET as each of the first and second switches SW13 and SW14, which is an example of a voltage-controlled switch.

The source of the first switch SW13 is connected to the cathode of the first diode D13. The drain of the first switch SW13 is connected to the first end of the first wiring LP1, and the second end of the first wiring LP1 is connected to the first DC terminal TD1. The anode of the first diode D13 is connected to the first end of the second wiring LP2, and the second end of the second wiring LP2 is connected to the second DC terminal T2.

Similarly, the source of the second switch SW14 is connected to the cathode of the second diode D14. The drain of the second switch SW14 is connected to the first end of the first wiring LP1. The anode of the second diode D14 is connected to the first end of the second wiring LP2.

The connection point between the source of the first switch SW13 and the cathode of the first diode D13 is connected to the first end of the fifth wiring LP5, and the second end of the fifth wiring LP5 is connected to the first AC terminal TA1. Similarly, the connection point between the source of the second switch SW14 and the cathode of the second diode D14 is connected to the first end of the sixth wiring LP6, and the second end of the sixth wiring LP6 is connected to the second AC terminal TA2.

The power converter system 100A1 includes first and second current sensors 36 and 37. The first current sensor 36 is provided on a connection line between the source of the first switch SW13 and the cathode of the first diode D13. The first current sensor 36 is configured to measure a current flowing through the first switch SW13 as the first inductor current IL1r. The second current sensor 37 is provided on a connection line between the source of the second switch SW14 and the cathode of the second diode D14. The second current sensor 37 is configured to measure a current flowing through the second switch SW14 as the second inductor current IL2r.

The first modification of the second embodiment achieves the same technical benefits as those achieved by the second embodiment.

Second Modification of the Second Embodiment

Figure 13:
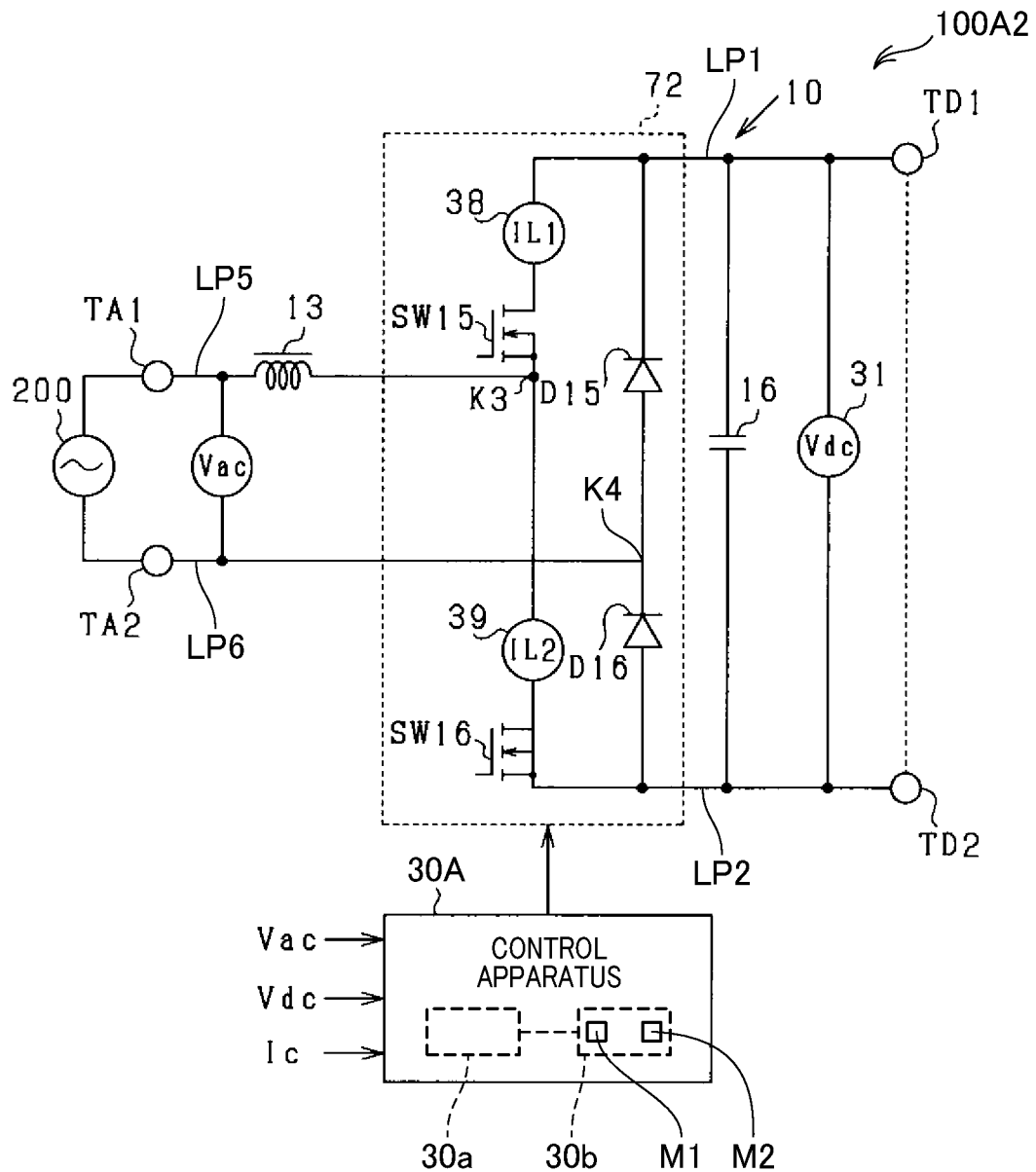
FIG. 13 is a circuit diagram schematically illustrating an example of the overall structure of a power conversion system according to a second modification of the second embodiment of the present disclosure.

FIG. 13 schematically illustrates a circuit structure of a power converter system 100A2 according to the second modification of the second embodiment.

The circuit structure of the power converter system 100A2 includes a full-bridge circuit 72 whose circuit structure is different from the circuit structure of the full-bridge circuit 70 of the second embodiment. The following mainly describes the different circuit structure, and omits or simplifies descriptions of like parts between the second embodiment and its second modification, to which identical or like reference characters are assigned, thus eliminating redundant description.

The full-bridge circuit 72 includes first and second diodes D15 and D16, and first and second switches SW15 and SW16. The second modification of the second embodiment uses an N-channel MOSFET as each of the first and second switches SW15 and SW16, which is an example of a voltage-controlled switch.

The source of the first switch SW15 is connected to the drain of the second switch SW16. The drain of the first switch SW15 is connected to the first end of the first wiring LP1. The source of the second switch SW16 is connected to the first end of the second wiring LP2.

The anode of the first diode D15 is connected to the cathode of the second diode D16. The cathode of the first diode D15 is connected to the first end of the first wiring LP1. The anode of the second diode D16 is connected to the first end of the second wiring LP2.

The connection point K3 between the source of the first switch SW15 and the drain of the second switch SW16 is connected to the first end of the fifth wiring LP5. Similarly, the connection point K4 between the anode of the first diode D15 and the cathode of the second diode D16 is connected to the first end of the sixth wiring LP6.

The power converter system 100A2 includes first and second current sensors 38 and 39. The first current sensor 38 is provided on a connection line between the drain of the first switch SW15 and the first wiring LP1. The first current sensor 38 is configured to measure a current flowing through the first switch SW15 as the first inductor current IL1r. The second current sensor 39 is provided on a connection line between the source of the first switch SW15 and the drain of the second switch SW16. The second current sensor 39 is configured to measure a current flowing through the second switch SW16 as the second inductor current IL2r.

The second modification of the second embodiment achieves the same technical benefits as those achieved by the second embodiment.

Third Embodiment

Figure 14:
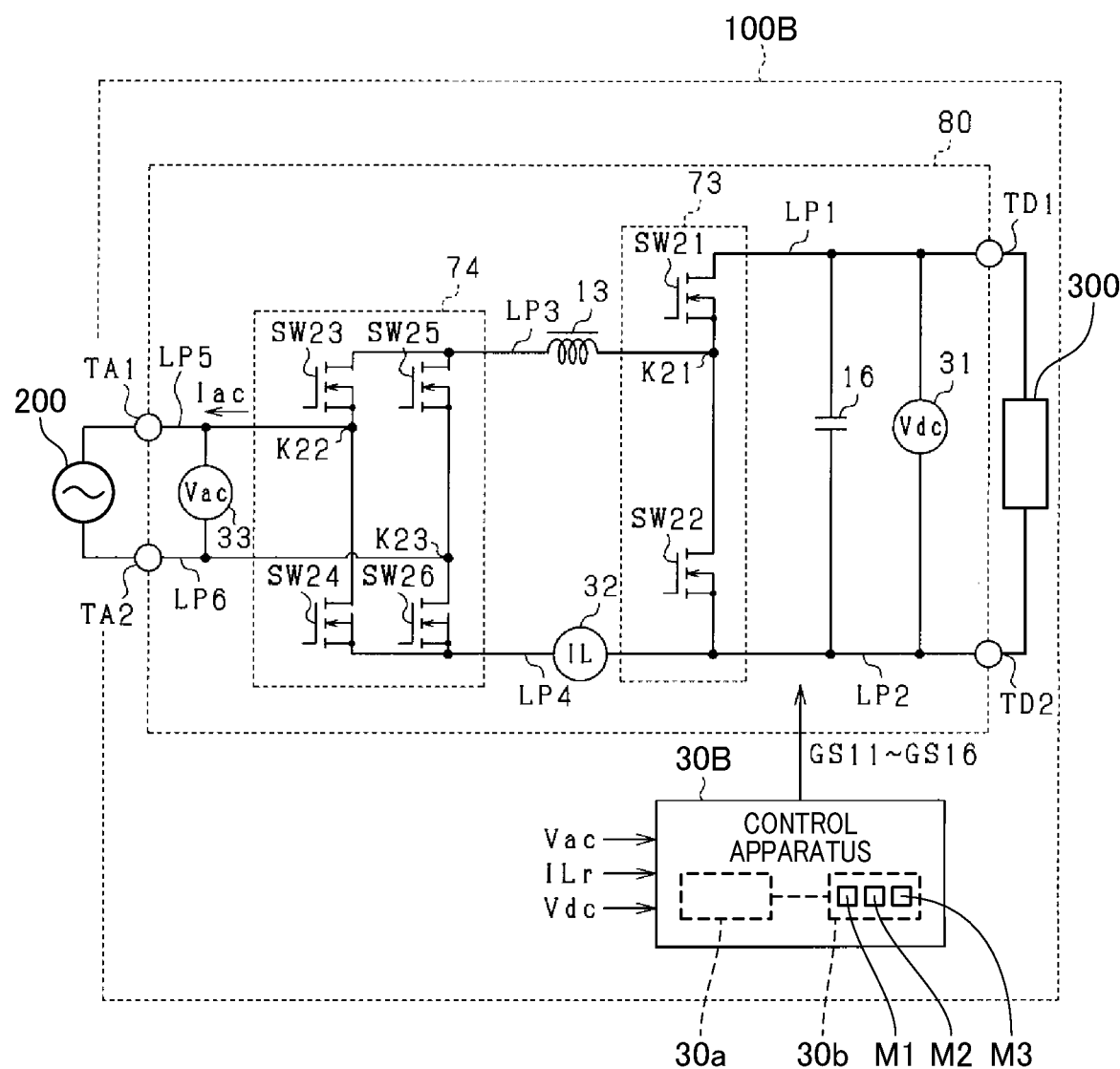
FIG. 14 is a circuit diagram schematically illustrating an example of the overall structure of a power conversion system according to the third embodiment of the present disclosure.

The following describes the third embodiment of the present disclosure with reference to FIGS. 14 to 18. FIG. 14 schematically illustrates a power converter system 100B according to the third embodiment. The structures and/or functions of the power converter system 100B according to the third embodiment are different from those of the power converter system 100 according to the first embodiment in the following points. So, the following mainly describes the different points, and omits or simplifies descriptions of like parts between the first and third embodiments, to which identical or like reference characters are assigned, thus eliminating redundant description.

The power converter system 100B is configured to convert a DC voltage Vdc into an AC voltage Vac.

FIG. 14 schematically illustrates the power converter system 100B. The power converter system 100B includes a DC-AC converter 80 and a control apparatus 30B.

The DC-AC converter 80 is connected to a DC power source 300 via the first and second DC terminals TD1 and TD2. The DC-AC converter 80 is also connected to the AC power source 200 as an example of at least one AC load via the first and second AC terminals TA1 and TA2.

The DC-AC converter 80 includes the capacitor 16, a half-bridge circuit 73, a full-bridge circuit 74, the inductor 13, and the first to sixth wirings LP1 to LP6. Each of the first to sixth wirings LP1 to LP6 has opposing first and second ends.

The half-bridge circuit 73 includes a first switch SW21 and a second switch SW22. Each of the first and second switches SW21 and SW22 is comprised of, for example, an N-channel MOSFET, which is an example of a voltage-controlled switch. The source of the first switch SW21 is connected to the drain of the second switch SW22. The drain of the first switch SW21 is connected to the first end of the first wiring LP1. The source of the second switch SW22 is connected to the first end of the second wiring LP2. Each of the first and second switches SW21 and SW22 includes an intrinsic diode connected in antiparallel thereto.

The connection point, which will be referred to as a first connection point K21, between the source of the first switch SW21 and the drain of the second switch SW22, is connected to the second end of the third wiring LP3. The inductor 13 is mounted on the third wiring LP3. The source of the second switch SW22 is connected to the second end of the fourth wiring LP4.

The capacitor 16 is connected between the first and second wirings LP1 and LP2 to be parallel to the series connection member comprised of the fifth diode D5 and the switch SW connected in series.

The full-bridge circuit 74 includes third to sixth switches SW23 to SW26. Each of the third to sixth switches SW23 to SW26 is comprised of, for example, an N-channel MOSFET, which is an example of a voltage-controlled switch. The source of the third switch SW23 is connected to the drain of the fourth switch SW24. The source of the fifth switch SW25 is connected to the drain of the sixth switch SW26.

The drain of each of the third and fifth switches SW23 and SW25 is connected to the first end of the third wiring LP3. The source of each of the fourth and sixth switches SW24 to SW26 is connected to the first end of the second wiring LP2. Each of the first and second switches SW21 and SW22 includes an intrinsic diode connected in antiparallel thereto.

The connection point, which will be referred to as a second connection point K22, between the source of the third switch SW23 and the drain of the fourth switch SW24 is connected to the first end of the fifth wiring LP5, and the second end of the fifth wiring LP5 is connected to the first AC terminal TA1. Similarly, the connection point, which will be referred to as a third connection point K23, between the source of the fifth switch SW25 and the drain of the sixth switch SW26 is connected to the first end of the sixth wiring LP6, and the second end of the sixth wiring LP6 is connected to the second AC terminal TA2.

Figure 15:
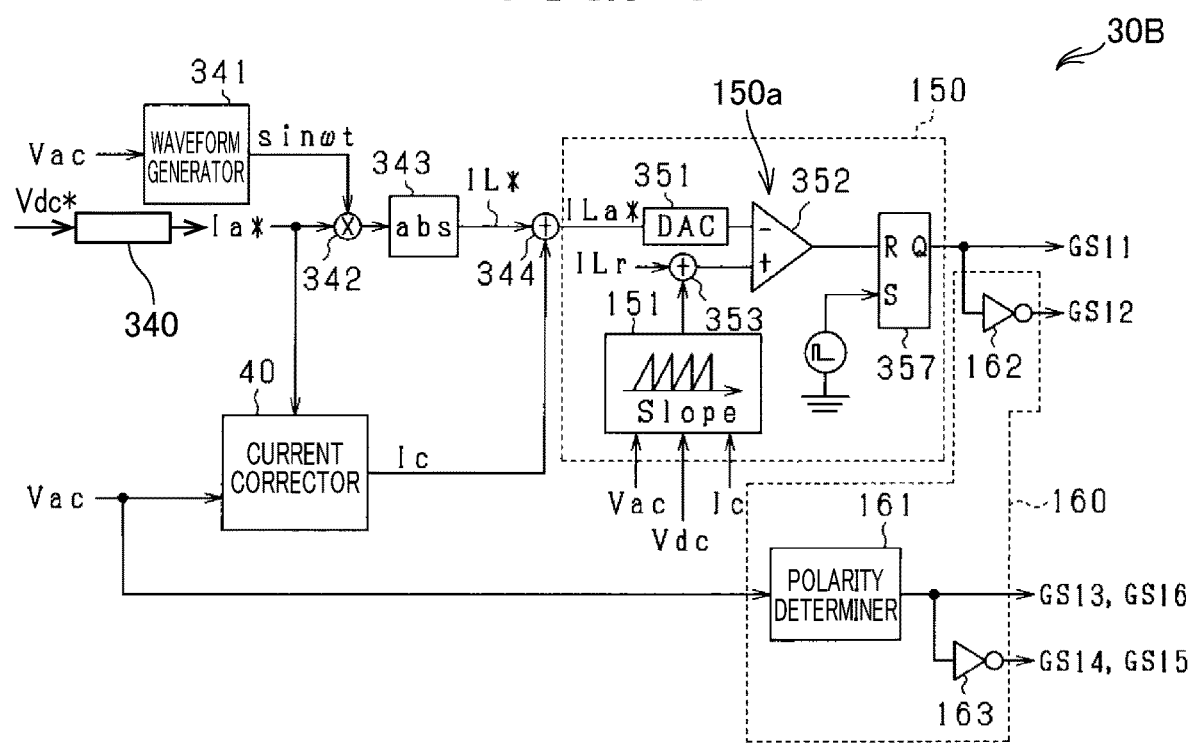
FIG. 15 is a circuitry block diagram schematically illustrating an example of the structure of a control apparatus illustrated in FIG. 14.

Next, the following describes in detail the functional structure of the control apparatus 30B with reference to FIG. 15.

The control apparatus 30B is configured to control closing or opening, i.e. switch on or off, the first and second switches SW21 and SW22 in the known peak current mode. For example, the control apparatus 30B functionally includes a current control unit 150 and a selector 160 in addition to the amplitude command calculator 340, waveform generator 341, multiplier 342, absolute value calculator 343, and adder 344.

The current control unit 150 determines a first gate signal GS11 for the first switch SW11 for on-off control of the first switch SW11 in accordance with the inductor current ILr measured by the current sensor 32, and the corrected command current ILa*, and outputs the first gate signal GS11 to the gate of the first switch SW11, thus controlling on-off switching operations of the first switch SW11.

The selector 160 includes a polarity determiner 161, a first inverter gate 162, and a second inverter gate 163.

The output of the current control unit 150 is connected to the first inverter gate 162, so that a second gate signal GS12, which has one of the high voltage level and the low voltage level, is output from the first inverter gate 162 to the gate of the second switch SW22; one of the high voltage level and the low voltage level is the inverse of the level of the first gate signal GS11.

For example, the current control unit 150 includes a slope compensator 151 in addition to the D/A converter 351, comparator 352, adder 353, and RS flipflop 357. The D/A converter 351, comparator 352, adder 353, and RS flipflop 357 of the current control unit 150 serve as, for example, a current controller 150a. The current corrector 40 and the slope compensator 151 serves as, for example, a slope compensation unit.

The slope compensator 151 generates the slope compensation signal Slope having the variable slope ms in accordance with the AC voltage Vac, the DC voltage Vdc, and the current correction Ic, and outputs the slope compensation signal Slope to the adder 353.

The polarity determiner 161 has an output terminal, and is configured to determine whether the AC voltage Vac has a positive polarity or a negative polarity every predetermined cycle. The polarity determiner 161 is also configured to (1) Output, from the output terminal, an output signal with a high voltage level upon determining that the AC voltage Vac has the positive polarity (2) Output, from the output terminal, the output signal with a low voltage level upon determining that the AC voltage Vac has the negative polarity The output terminal of the polarity determiner 161 is connected to the gate of each of the third and sixth switches SW23 and SW26, so that the polarity determiner 161 outputs the output signal to the third switch SW23 as a third gate signal GS13 and to the sixth switch SW26 as a sixth gate signal GS16.

The output terminal of the polarity determiner 161 is also connected via the second inverter gate 163 to the gate of each of the fourth and fifth switches SW24 and SW25, so that the polarity determiner 161 outputs, via the second inverter gate 163, the output signal to the fourth switch SW24 as a fourth gate signal GS14 and to the fifth switch SW25 as a fifth gate signal GS15. Each of the fourth and fifth gate signals GS14 and 15 has one of the high voltage level and the low voltage level, which is the inverse of the level of each of the third and sixth gate signals GS13 and GS16.

Figure 16A:
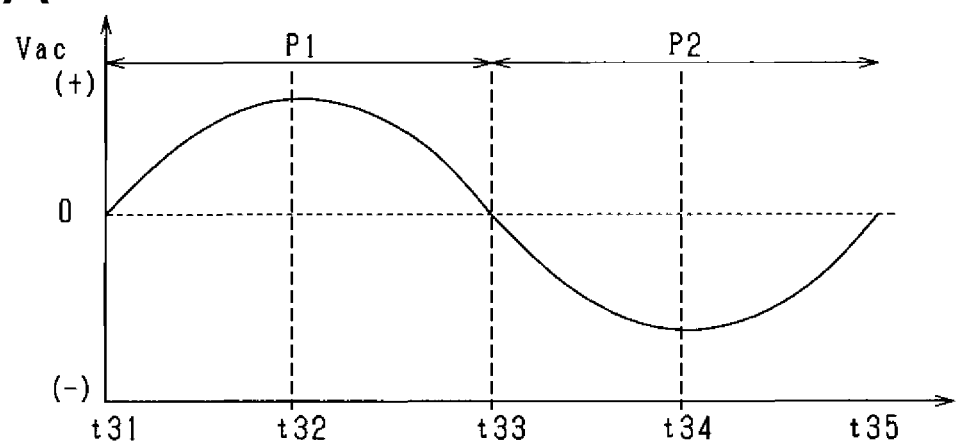
FIGS. 16A and 16B are a joint timing chart schematically illustrating how the slope is changed over time in correlation with an AC voltage according to the third embodiment.

FIG. 16A schematically illustrates how the AC voltage Vac is changed over time according to the third embodiment, which is similar to the AC voltage Vac illustrated in FIG. 3A, and FIG. 16D schematically illustrates how the variable slope ms of the slope compensation signal Slope is changed over time according to the third embodiment.

Figure 16B:
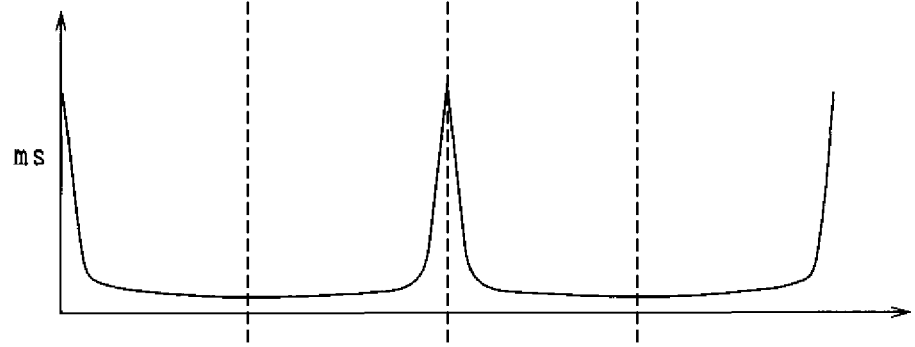

The inventors have found that, if the DC voltage Vdc is converted into the AC voltage Vac by the DC-AC converter 80, the deviation range parameter Δi indicative of how the pre-correction command current IL* is deviated from the average Iave of the inductor current ILr takes a largest value each time the AC voltage Vac reaches a corresponding one of zero-crossing points (see times t31, t33, and t35 in FIG. 16B). In contrast, the inventors have found that, if the DC voltage Vdc is converted into the AC voltage Vac by the DC-AC converter 80, the deviation range parameter Δi takes a smallest absolute value each time the AC voltage Vac is located close to a corresponding one of peaks (see times t32 and t34 in FIG. 16B).

Based on the above finding, the control apparatus 30B is configured to control the slope compensation signal Slope such that the slope ms of the slope compensation signal Slope cyclically changes to (1) Take a local maximum value each time the AC voltage Vac reaches a corresponding one of the zero-crossing points (see times t31, t33, and t35 in FIGS. 16A and 16B)

(2) Take a local minimum value each time the AC voltage Vac reaches a corresponding one of the peaks (see times t32 and t34 in FIGS. 16A and 16B)

As described above, the slope compensator 151 sets the slope ms of the slope compensation signal Slope for each period of the AC voltage Vac such that the slope ms has 1. The local minimum value for each of the positive half period P1 and the negative half period P2 of the AC voltage Vac 2. The local maximum value between the positive and negative half periods P1 and P2 of the AC voltage Vac (see FIG. 16B)

For example, the control apparatus 30B has a slope map M3 in data-table format, in mathematical expression format, and/or program format stored in, for example, the at least one memory 30b. The slope map M3 includes information indicative of a relationship among (1) Each of values of the slope ms of the slope compensation signal Slope (2) A corresponding one of combinations, each of which is comprised of a corresponding value of the AC voltage Vac, a corresponding value of the DC voltage Vdc, and a corresponding value of the current correction Ic That is, the slope compensator 151 refers to the slope map M3 for each switching cycle Tsw, and extracts, for the corresponding switching cycle Tsw, a value of the slope ms of the slope compensation signal Slope from the slope map M3; the extracted value of the slope ms in the slope map M3 correlates with a corresponding combination of a corresponding value of the AC voltage Vac, a corresponding value of the DC voltage Vdc, and a corresponding value of the current correction Ic.

Next, the following describes an example of a method of generating the slope map M3 indicative of the slope ms and the combination of the AC voltage Vac, the DC voltage Vdc, and the current correction Ic.

Because the DC-AC converter 80 is configured to convert the DC voltage Vdc into the AC voltage Vac, the duty factor D for the switch SW can be expressed by the following equation (5a):

$$D = \frac{|Vac|}{Vdc} \tag{5a}$$

In addition, the increasing slope mb of the inductor current ILr has a predetermined correlation with the DC voltage Vdc and the absolute signal |Vac| of the AC voltage Vac; this correlation can be expressed by the following equation (5b):

$$mb = (Vdc - |Vac|)/L \tag{5b}$$

Assigning the equations (5a) and (5b) to the equation (5) enables the following equation (6) to be derived:

$$\Delta i = \frac{Vdc - |Vac|}{2L} \cdot \left(\frac{|Vac|}{Vdc}\right) \cdot Tsw + ms \cdot \left(\frac{|Vac|}{Vdc}\right) \cdot Tsw \tag{6}$$

Setting the current correction Ic to the deviation range parameter Δi and controlling, using the corrected command current ILa*, the switch SW in the peak current mode enable a degree of distortion in the alternating current Iac to be reduced. That is, replacing the deviation range parameter Δi with the current correction Ic in the equation (6) enables the current correction Ic, which reduces a degree of distortion in the alternating current Iac, to be calculated. Based on the current correction Ic and the equation (6), the slope ms of the slope compensation signal Slope can be calculated in accordance with the following equation (7):

$$ms = \frac{Ic - \frac{(Vdc - |Vac|) \cdot \left(\frac{|Vac|}{Vdc}\right) \cdot Tsw}{2L}}{\left(\frac{|Vac|}{Vdc}\right) \cdot Tsw} \tag{7}$$

That is, the control apparatus 30B has performed a preprocessing routine to calculate, in accordance with the equation (7), a value of the slope ms of the slope compensation signal Slope for each switching cycle Tsw while changing a value of the AC voltage Vac within a predetermined allowable range to thereby change a value of the DC voltage Vdc, and changing a value of the current correction Ic within a predetermined range. Then, the control apparatus 30B has stored the calculated values of the slope ms in the at least one memory 30b such that each of the values of the slope ms correlate with (1) A corresponding value of the AC voltage Vac (2) A corresponding value of the DC voltage Vdc (3) A corresponding value of the current correction Ic This enables the slope map M3 to be generated in the at least one memory 30b.

Next, the following describes how the control apparatus 30B works, and also describes technical benefits achieved by the control apparatus 30B.

Figure 17A:
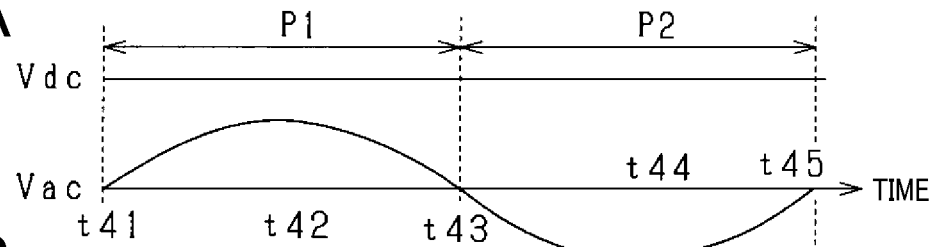
FIGS. 17A to 17F are a joint timing chart schematically illustrating how the control apparatus works according to the third embodiment.
Figure 17B:
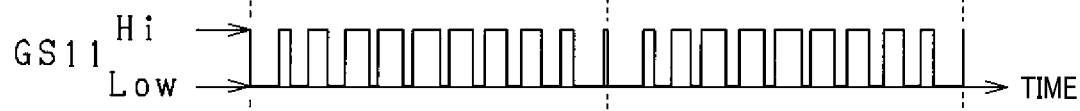

FIG. 17A schematically illustrates how the AC voltage Vac and the DC voltage Vdc are changed over time, and FIG. 17B schematically illustrates how the first gate signal GS11 is changed over time. Note that the second gate signal GS12 is changed such that the level of the second gate signal GS12 is opposite to the high or low voltage level of the first gate signal GS11.

Figure 17C:
Figure 17D:
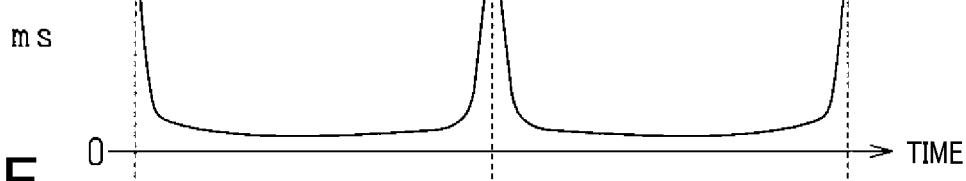
Figure 17E:
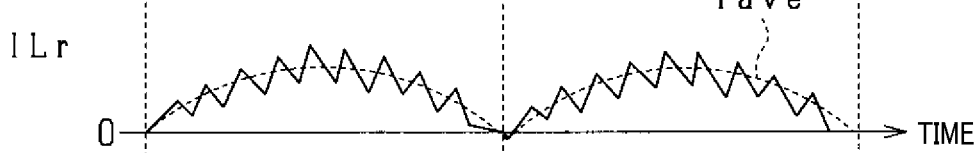
Figure 17F:
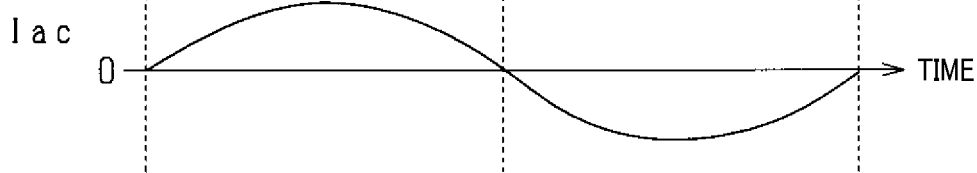

FIG. 17C schematically illustrates how the current correction Ic is changed over time, and FIG. 17D schematically illustrates how the slope ms of the slope compensation signal Slope is changed over time. FIG. 17E schematically illustrates how the inductor current ILr is changed over time, and FIG. 17F schematically illustrates how the alternating current Iac is changed over time.

The control apparatus 30B causes the third and sixth gate signals GS13 and GS16 to be in the high voltage level while the AC voltage Vac has the positive polarity within the positive half period P1, causing the third and sixth switches SW23 and SW26 to be in the on state, i.e. close state while the fourth and fifth switches SW24 and SW25 is in the off state, i.e. open state.

While the third and sixth switches SW23 and SW26 are in the on state and the fourth and fifth switches SW24 and SW25 are in the off state, the current control unit 150 controls the first and second switches SW11 and SW12 in the peak current mode.

Specifically, when the present clock pulse of the clock rises, the current control unit 150 causes the flipflop 357 to output the high-voltage signal to the gate of the first switch SW11 to thereby turn on the first switch SW11 while outputting the low-voltage signal to the gate of the second switch SW12 to thereby turning off the second switch SW12.

While the slope-corrected inductor current (Slope+ILr) is lower than the corrected command current ILa*, the current control unit 150 maintains the on command of the first gate signal GS1, thus maintaining the on state of the first switch SW11.

During the on state of the first switch SW11 with the second switch SW12 being in the off state, the inductor current ILr flows from the DC power source 300 through the first switch SW21, the inductor 13, the third switch SW23, the AC power source 200, and the sixth switch SW26. This enables magnetic energy to be charged in the inductor 13.

When the slope-corrected inductor current (Slope+ILr) becomes identical to the corrected command current ILa*, the current control unit 150 causes the high-voltage signal to be input to the reset terminal R of the flipflop 357, thus outputting the low-voltage signal from the flipflop 357 to the gate of the first switch SW11 as the off command of the first gate signal GS1 to thereby turn off the first switch SW11 while outputting the high-voltage signal to the gate of the second switch SW12 to thereby turning on the second switch SW12.

During the off state of the first switch SW11 with the second switch SW12 being in the on state, the inductor current ILr based on the magnetic energy charged in the inductor 13 flows through the third switch SW23, the AC power source 200, and the sixth switch SW26.

Additionally, the control apparatus 30B causes the third and sixth gate signals GS13 and GS16 to be in the low voltage level while the AC voltage Vac has the negative polarity within the negative half period P2, causing the third and sixth switches SW23 and SW26 to be in the off state while the fourth and fifth switches SW24 and SW25 is in the on state.

While the fourth and fifth switches SW24 and SW25 are in the on state and the third and sixth switches SW23 and SW26 are in the off state, the current control unit 150 controls the first and second switches SW11 and SW12 in the peak current mode.

Specifically, when the present clock pulse of the clock rises, the current control unit 150 causes the flipflop 357 to output the high-voltage signal to the gate of the first switch SW11 to thereby turn on the first switch SW11 while outputting the low-voltage signal to the gate of the second switch SW12 to thereby turning off the second switch SW12.

While the slope-corrected inductor current (Slope+ILr) is lower than the corrected command current ILa*, the current control unit 150 maintains the on command of the first gate signal GS1, thus maintaining the on state of the first switch SW11.

During the on state of the first switch SW11 with the second switch SW12 being in the off state, the inductor current ILr flows from the DC power source 300 through the first switch SW21, the inductor 13, the fifth switch SW25, the AC power source 200, and the fourth switch SW24. This enables magnetic energy to be charged in the inductor 13.

When the slope-corrected inductor current (Slope+ILr) becomes identical to the corrected command current ILa*, the current control unit 150 causes the high-voltage signal to be input to the reset terminal R of the flipflop 357, thus outputting the low-voltage signal from the flipflop 357 to the gate of the first switch SW11 as the off command of the first gate signal GS1 to thereby turn off the first switch SW11 while outputting the high-voltage signal to the gate of the second switch SW12 to thereby turning on the second switch SW12.

During the off state of the first switch SW11 with the second switch SW12 being in the on state, the inductor current ILr based on the magnetic energy charged in the inductor 13 flows through the fifth switch SW25, the AC power source 200, and the fourth switch SW24.

In particular, the slope compensator 151 cyclically changes the slope ms of the slope compensation signal Slope such that the slope ms takes (1) A local maximum value each time the AC voltage Vac reaches a corresponding one of the zero-crossing points (see times t41, t43, and t45 in FIGS. 17A and 17D)

(2) A local minimum value each time the AC voltage Vac reaches a corresponding one of the peaks (see times t42 and t44 in FIGS. 17A and 17D)

This configuration enables the average Iave of the inductor current ILr to have a positive half of a sinusoidal wave for each half (T/2) of the period T of the AC voltage Vac, resulting in the input AC current Iac having a sinusoidal waveform with a suppressed distortion therein.

Figure 18A:
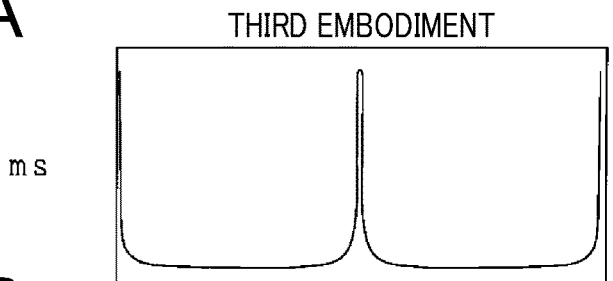
FIG. 18A is a graph schematically illustrating how the slope of the slope compensation signal is changed over time according to the third embodiment.
Figure 18B:
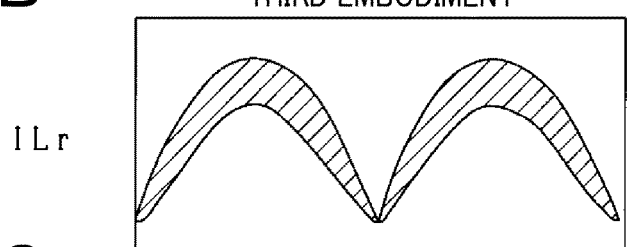
FIG. 18B is a graph schematically illustrating how the inductor current is changed over time according to the third embodiment.
Figure 18C:
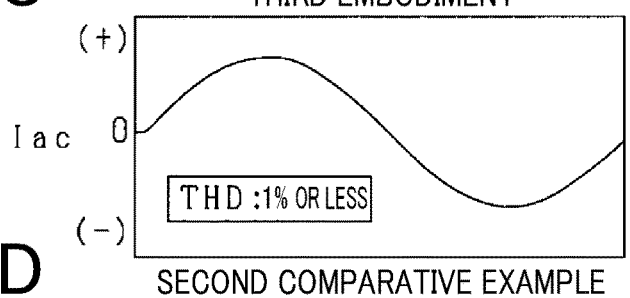
FIG. 18C is a graph schematically illustrating how the alternating current is changed over time according to the third embodiment.

FIGS. 18A, 18B, and 18C schematically illustrate how the slope ms of the slope compensation signal Slope, the inductor current ILr, and the alternating current Iac are respectively changed over time according to the first embodiment. In contrast, FIG. 18D schematically illustrates the slope ms of the slope compensation signal Slope, which is set to a constant value according to a second comparative example, and FIGS. 18E and 18F schematically illustrate how the inductor current ILr and the alternating current Iac are respectively changed over time according to the second comparative example.

Figure 18D:
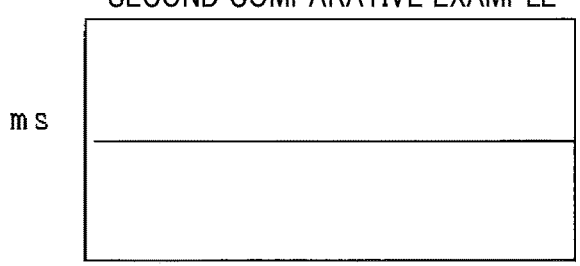
FIG. 18D is a graph schematically illustrating how the slope of the slope compensation signal is changed over time according to a second comparative example.
Figure 18E:
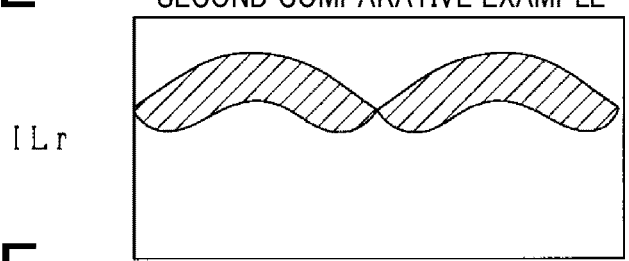
FIG. 18E is a graph schematically illustrating how the inductor current is changed over time according to the second comparative example.
Figure 18F:
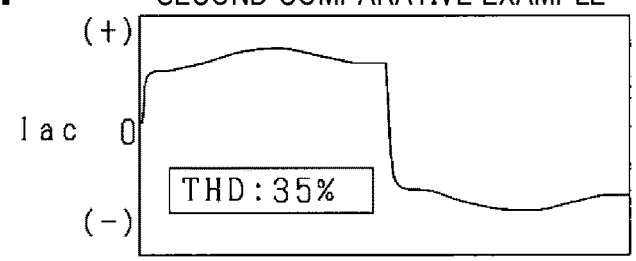
FIG. 18F is a graph schematically illustrating how the alternating current is changed over time according to the second comparative example.

Note that the conditions under which the peak current mode according to the third embodiment were carried out to obtain the characteristics illustrated in FIGS. 18A to 18C are set to be identical to those under which the peak current mode according to the second comparative example were carried out to obtain the characteristics illustrated in FIGS. 18D to 18E.

Note that, in each of FIGS. 18B and 18E, a hatched region of the corresponding inductor current ILr represents the range of ripples in the corresponding inductor current ILr.

A flow of the inductor current ILr illustrated in FIG. 18E through the inductor 13 according to the second comparative example results in the alternating current Iac being distorted at or around each of zero-crossing points. For example, the total harmonic distortion rate THD of the alternating current Iac according to the second comparative example is approximately 35%.

In contrast, a flow of the inductor current ILr illustrated in FIG. 18B through the inductor 13 according to the third embodiment results in a reduction of the degree of distortion in the alternating current Iac. For example, the total harmonic distortion rate THD of the alternating current Iac according to the third embodiment is equal to or less than 1%.

As described above, the control apparatus 30B of the third embodiment is applied to the power conversion system 100B for converting the DC voltage Vdc into the AC voltage Vac. During power conversion of the DC voltage Vdc into the AC voltage Vac, the value of the deviation range parameter Δi indicative of how the pre-correction command current IL* is deviated from the average Iave of the inductor current ILr becomes small.

From this viewpoint, the control apparatus 30B cyclically changes the slope ms of the slope compensation signal Slope such that the slope ms takes (1) A local maximum value each time the AC voltage Vac reaches a corresponding one of the zero-crossing points (2) A local minimum value each time the AC voltage Vac reaches a corresponding one of the peaks This configuration enables the average Iave of the inductor current ILr to have a positive half of a sinusoidal wave for each half (T/2) of the period T of the AC voltage Vac, resulting in the input AC current Iac having a sinusoidal waveform with a suppressed distortion therein in conversion of the DC voltage Vdc into the AC voltage Vac.

Modification of Third Embodiment

In conversion of the DC voltage Vdc into the AC voltage Vac, the decreasing slope ma of the inductor current ILr can be expressed by the following equation (B):

$$ma = |Vac|/L \quad (B)$$

For this reason, for preventing the subharmonic oscillations of the inductor current ILr, the control apparatus 30B according to a modification of the third embodiment can be configured to increase the slope ms with an increase in the absolute value of the AC voltage Vac, i.e. an increase of the RMS Vrms of the AC voltage Vac.

Fourth Embodiment

Figure 19:
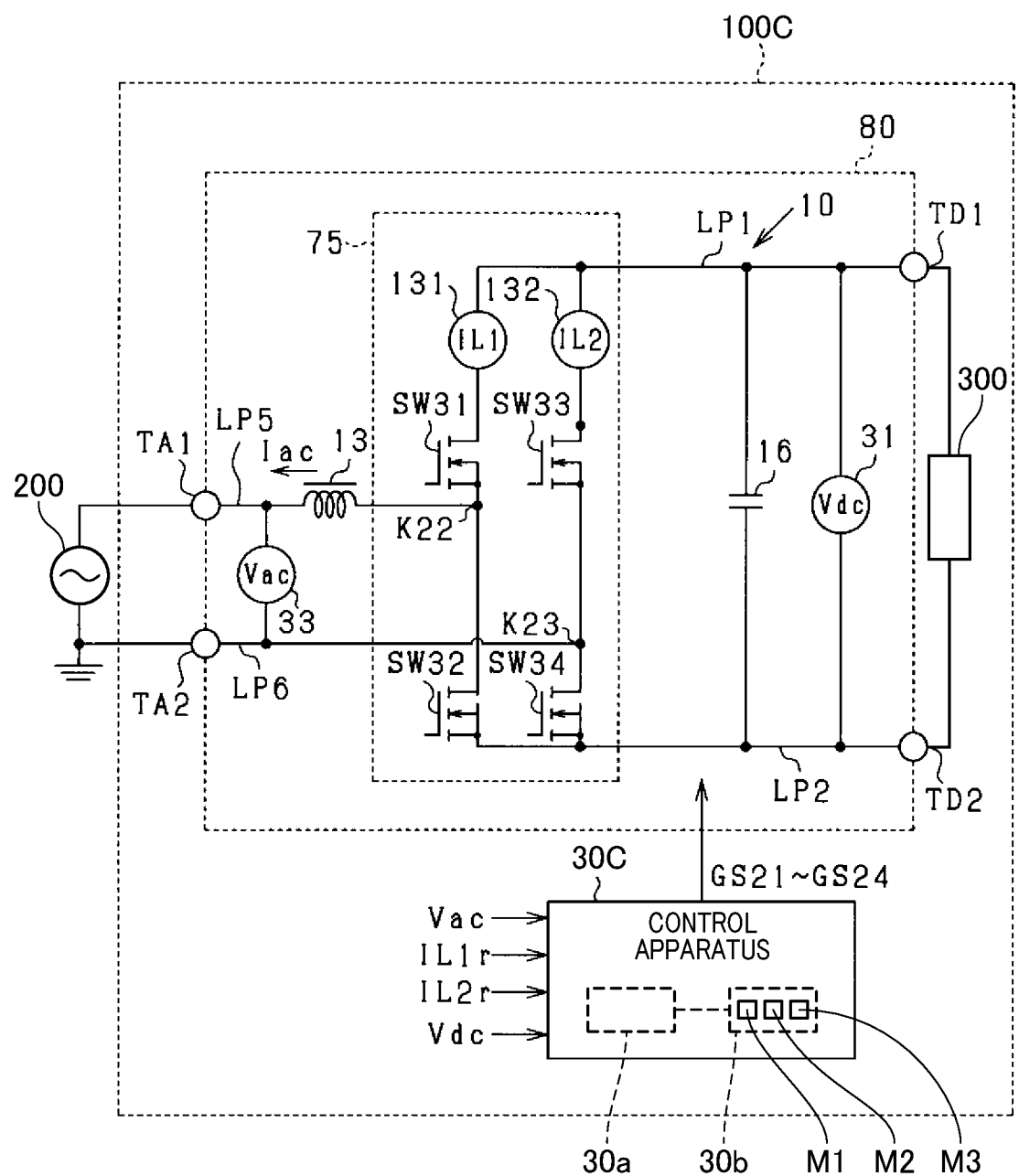
FIG. 19 is a circuit diagram schematically illustrating an example of the overall structure of a power conversion system according to a first modification of the fourth embodiment of the present disclosure.
Figure 20:
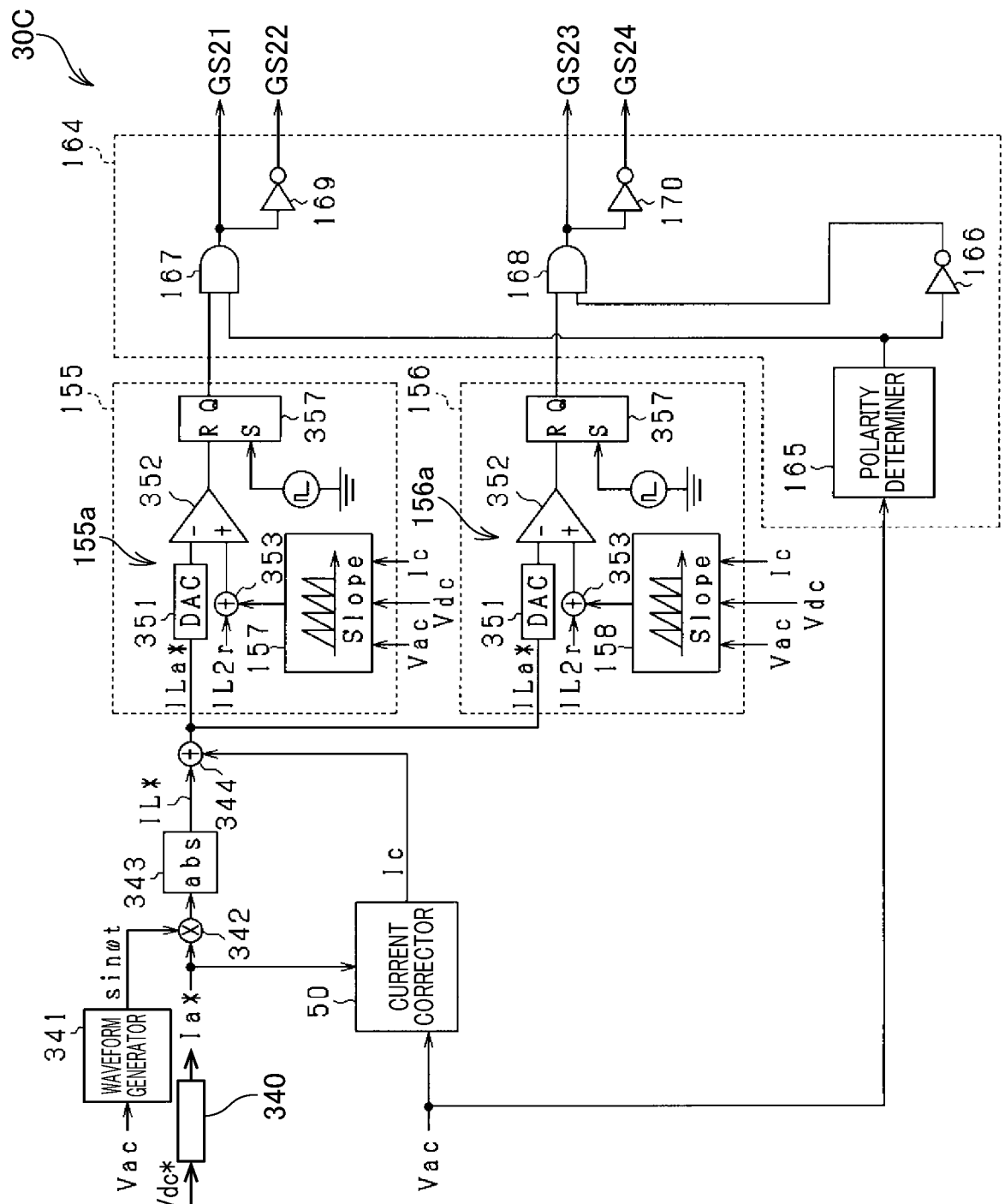
FIG. 20 is a circuitry block diagram schematically illustrating an example of the structure of a control apparatus illustrated in FIG. 19.

The following describes the fourth embodiment of the present disclosure with reference to FIGS. 19 to 21. FIG. 19 schematically illustrates a power converter system 100C according to the fourth embodiment. The structures and/or functions of the power converter system 100C according to the fourth embodiment are different from those of the power converter system 100B according to the third embodiment in the following points. So, the following mainly describes the different points, and omits or simplifies descriptions of like parts between the third and fourth embodiments, to which identical or like reference characters are assigned, thus eliminating redundant description.

The circuit structure of the power converter system 100C is different from the circuit structure of the power converter system 100B.

Specifically, the power converter system 100C includes no half-bridge circuits.

FIG. 19 schematically illustrates the power converter system 100C. The power converter system 100C includes a full-bridge circuit 75. The full-bridge circuit 75 is connected to the first DC terminal TD1 via the first wiring LP1, and the full-bridge circuit 70 is connected to the second DC terminal TD2 via the second wiring LP2.

Specifically, the full-bridge circuit 75 includes first to fourth switches SW31 to SW34. The fourth embodiment uses an N-channel MOSFET as each of the first to fourth switches SW31 and SW34, which is an example of a voltage-controlled switch. Because the first to fourth switches SW31 to SW34 correspond to the respective first to fourth switches SW23 to SW26 according to the third embodiment, the descriptions of these switches SW31 to SW34 are omitted.

The drain of each of the first and third switches SW31 and SW33 is connected to the first end of the first wiring LP1, and the source of each of the second and fourth switches SW32 and SW34 is connected to the first end of the second wiring LP2.

The power converter system 100C also includes a control apparatus 30C and first and second current sensors 131 and 132. The first current sensor 131 is provided on a connection line between the drain of the first switch SW31 and the first end of the first wiring LP1. The first current sensor 131 is configured to measure a current flowing through the first switch SW31 as a first inductor current IL1r. The second current sensor 132 is provided on a connection line between the drain of the third switch SW33 and the first end of the first wiring LP1. The second current sensor 132 is configured to measure a current flowing through the third switch SW33 as a second inductor current IL2r.

Next, the following describes in detail the functional structure of the control apparatus 30C with reference to FIG. 20.

The control apparatus 30C functionally includes a first current control unit 155, a second current control unit 156, and a selector 64 in place of the current control unit 150 and selector 160 as compared with the structure of the control apparatus 30B.

The control apparatus 30C is configured to control close or open, i.e. on or off, of each of the first to fourth switches SW31 to SW34 in the peak current mode to thereby adjust the first and second inductor currents IL1r and IL2r, whose slopes have been compensated, to follow the corrected command current ILa*.

The first current control unit 155 includes a first slope compensator 157 for generating a first slope compensation signal Slope1 in accordance with the AC voltage Vac, the DC voltage Vdc, and the current correction Ic, and outputs the first slope compensation signal Slope1 to the adder 353 in the same manner as the slope compensator 151, so that the first slope compensation signal Slope1 is added to the first inductor current IL1.

The second current control unit 156 includes a second slope compensator 158 for generating a second slope compensation signal Slope2 in accordance with the AC voltage Vac, the DC voltage Vdc, and the current correction Ic, and outputs the second slope compensation signal Slope2 to the adder 353 in the same manner as the slope compensator 151, so that the second slope compensation signal Slope2 is added to the second inductor current IL2r.

The other components of each of the first and second current control units 155 and 156 are substantially identical to those of the current control unit 50 illustrated in FIG. 2, and therefore descriptions of them are omitted.

That is, the D/A converter 351, comparator 352, adder 353, and RS flipflop 357 of the first current control unit 155 serve as, for example, a first current controller 155a. Similarly, the D/A converter 351, comparator 352, adder 353, and RS flipflop 357 of the second current control unit 156 serve as, for example, a second current controller 156a. The current corrector 40, the first slope compensator 157 and the second slope compensator 158 serves as, for example, a slope compensation unit.

The selector 164 includes a polarity deter miner 165, a first AND circuit 167, a second AND circuit 168, and first to third inverter gates 166, 169, and 170.

Each of the first and second AND circuits 167 and 168 has first and second input terminals, the polarity determiner 165 has an output terminal, and each of the first to third inverter gates 166, 169, and 170 has opposing input and output terminals. The output terminal of the polarity determiner 165 is connected to the first input terminal of the first AND circuit 167, and to the input terminal of the first inverter gate 166. The output terminal of the first inverter gate 166 is connected to the first input terminal of the second AND circuit 168. The second input terminal of the first AND circuit 167 is connected to the output terminal of the flipflop 357 of the first current control unit 155. The second input terminal of the second AND circuit 168 is connected to the output terminal of the flipflop 357 of the second current control unit 156.

The polarity determiner 165 is configured to determine whether the AC voltage Vac has a positive polarity or a negative polarity every predetermined cycle. The polarity determiner 165 is also configured to (1) Output, from the output terminal, an output signal with a high voltage level to each of the first AND circuit 167, the second AND circuit 168, and the first inverter gate 166 upon determining that the AC voltage Vac has the positive polarity (2) Output, from the output terminal, the output signal with a low voltage level to each of the first AND circuit 167, the second AND circuit 168, and the first inverter gate 166 upon determining that the AC voltage Vac has the negative polarity The first AND circuit 167 has an output terminal connected to the gate of the first switch SW31 and also connected to the gate of the second switch SW32 via the second inverter gate 169.

The first AND circuit 167 outputs a first gate signal GS21, which has one of high and low voltage levels, to the gate of the first switch SW31 for opening or closing the first switch SW31, and outputs, via the second inverter gate 169, a second gate signal GS22 to the gate of the second switch SW32 for opening or closing the first switch SW31; the level of the second gate signal GS22 is the inverse of one of the high and low voltage levels of the first gate signal GS21.

The second AND circuit 168 has an output terminal connected to the gate of the third switch SW33 and also connected to the gate of the fourth switch SW34 via the third inverter gate 170.

The second AND circuit 168 outputs a third gate signal GS23, which has one of high and low voltage levels, to the gate of the third switch SW33 for opening or closing the third switch SW33, and outputs, via the second inverter gate 170, a fourth gate signal GS24 to the gate of the fourth switch SW34 for opening or closing the fourth switch SW34; the level of the fourth gate signal GS24 is the inverse of one of the high and low voltage levels of the third gate signal GS23.

Next, the following describes how the control apparatus 30C works, and also describes technical benefits achieved by the control apparatus 30C.

Figure 21A:
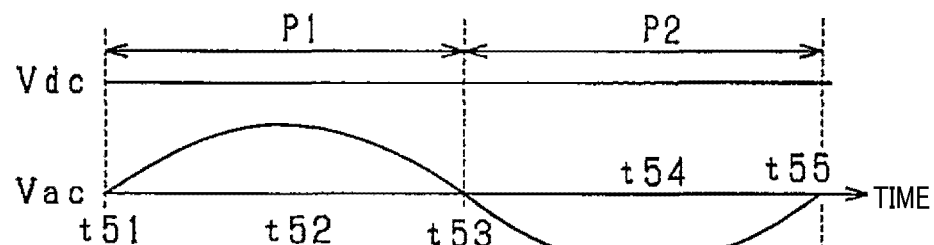
FIGS. 21A to 21H are a joint timing chart schematically illustrating how the control apparatus works according to the fourth embodiment.
Figure 21B:

FIG. 21A schematically illustrates how the AC voltage Vac and the DC voltage Vdc are changed over time, and FIG. 21B schematically illustrates how the first gate signal GS21 is changed over time.

Figure 21C:
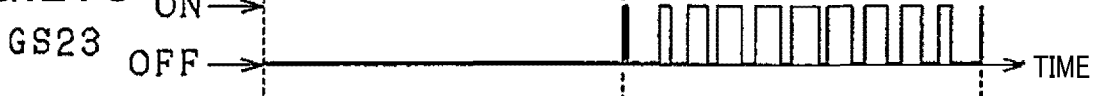
Figure 21D:
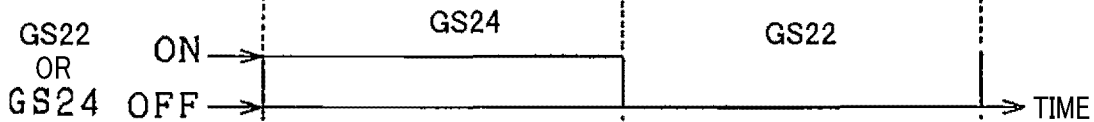

FIG. 21C schematically illustrates how the third gate signal GS23 is changed over time, and FIG. 21D schematically illustrates how the fourth gate signa GS24 is changed during the positive half period P1 of the AC voltage Vac and how the inverse of the second gate signal GS22 is changed over time.

Note that the waveform of the fourth gate signal GS24 during the positive half period P1 of the AC voltage Vac is identical to the inverse of the waveform of the second gate signal GS22 during the negative half period P2 of the AC voltage Vac. Similarly, the waveform of the fourth gate signal GS24 during the negative half period P2 of the AC voltage Vac is identical to the inverse of the waveform of the second gate signal GS22 during the positive half period P1 of the AC voltage Vac.

Figure 21E:
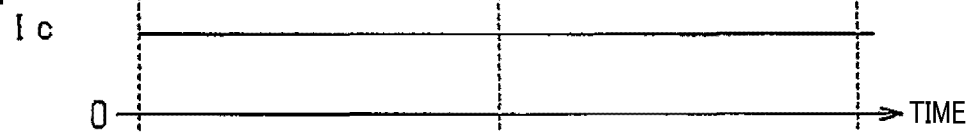
Figure 21F:
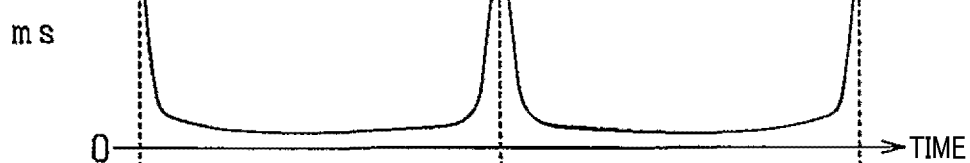
Figure 21G:
Figure 21H:
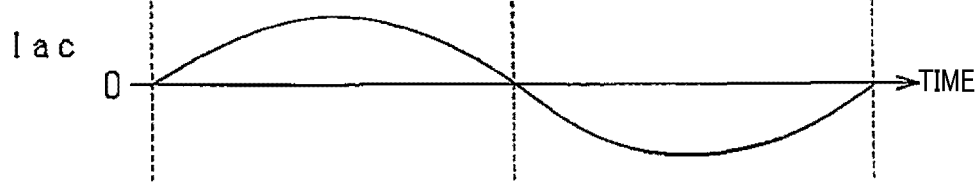

FIG. 21E schematically illustrates how the current correction Ic is changed over time, and FIG. 21F schematically illustrates how the slope ms of the slope compensation signal Slope is changed over time. FIG. 21G schematically illustrates how the first inductor current IL1r and the second inductor current IL2r, which alternately flow through the inductor 13 as an inductor current ILr, is changed over time, and FIG. 21H schematically illustrates how the alternating current Iac is changed over time.

The control apparatus 30C causes the fourth gate signal GS24 to be in the high voltage level and the third gate signal GS23 to be in the low voltage level while the AC voltage Vac has the positive polarity within the positive half period P1, causing the fourth switch SW34 to be in the on state, i.e. close state, and the third switch SW33 to be in the off state, i.e. open state.

While the fourth switch SW34 is in the on state and the third switch SW33 is in the off state, the first current control unit 155 controls the first and second switches SW31 and SW32 in the peak current mode.

Specifically, when the present clock pulse of the clock rises, the first current control unit 155 causes the flipflop 357 to output (1) The high-voltage signal to the gate of the first switch SW31 to thereby turn on the first switch SW31

(2) The low-voltage signal to the gate of the second switch SW32 via the second inverter gate 169 to thereby turn off the second switch SW32.

While the slope-corrected first inductor current (Slope+IL1r) is lower than the corrected command current ILa*, the first current control unit 155 maintains the on command of the first gate signal GS21, thus maintaining the on state of the first switch SW31.

During the on state of the first switch SW31 with the second switch SW32 being in the off state, the first inductor current IL1r flows from the DC power source 300 through the first switch SW31, the inductor 13, the AC power source 200, and the fourth switch SW34. This enables magnetic energy to be charged in the inductor 13.

When the slope-corrected first inductor current (Slope+IL1r) becomes identical to the corrected command current ILa*, the first current control unit 155 causes the high-voltage signal to be input to the reset terminal R of the flipflop 357, thus outputting (1) The low-voltage signal from the flipflop 357 to the gate of the first switch SW31 as the off command of the first gate signal GS21 via the first AND circuit 167 to thereby turn off the first switch SW31

(2) The high-voltage signal from the flipflop 357 to the gate of the second switch SW32 via the second inverter gate 169 to thereby turn on the second switch SW32

During the on state of the second switch SW32 with the first switch SW31 being in the off state, the first inductor current IL1r based on the magnetic energy charted in the inductor 13 flows through the AC power source 200, the fourth switch SW34, and the second switch SW32.

In particular, the first slope compensator 155 cyclically changes the slope ms of the first slope compensation signal Slope1 such that the slope ms takes (1) A local maximum value each time the AC voltage Vac reaches a corresponding one of the zero-crossing points (see times t51 and t53 in FIGS. 21A and 21F)

(2) A local minimum value each time the AC voltage Vac reaches a corresponding peak (see time t52 in FIGS. 21A and 21F)

This configuration enables the duty factor D of the first switch SW31 to have a smaller value each time the AC voltage Vac reaches a corresponding one of the zero-crossing points (t51 and t53) and a larger value each time the AC voltage Vac reaches a corresponding peak (t52) as compared with a case where the slope ms is set to a constant value. This therefore results in distortion in the alternating current Iac being suppressed during the positive half period P1 of the AC voltage Vac.

Additionally, the control apparatus 30C causes the second gate signal GS22 to be in the high voltage level and the first gate signal GS21 to be in the low voltage level while the AC voltage Vac has the negative polarity within the negative half period P2, causing the second switch SW32 to be in the on state, i.e. close state, and the first switch SW31 to be in the off state, i.e. open state.

While the second switch SW32 is in the on state and the first switch SW31 is in the off state, the second current control unit 156 controls the third and fourth switches SW33 and SW34 in the peak current mode.

Specifically, when the present clock pulse of the clock rises, the second current control unit 156 causes the flipflop 357 to output (1) The high-voltage signal to the gate of the third switch SW33 to thereby turn on the third switch SW33

(2) The low-voltage signal to the gate of the fourth switch SW34 via the third inverter gate 170 to thereby turn off the fourth switch SW34.

While the slope-corrected second inductor current (Slope+IL2r) is lower than the corrected command current ILa*, the second current control unit 156 maintains the on command of the third gate signal GS23, thus maintaining the on state of the third switch SW33.

During the on state of the third switch SW33 with the fourth switch SW34 being in the off state, the second inductor current IL2r flows from the DC power source 300 through the third switch SW33, the AC power source 200, the inductor 13, and the second switch SW32. This enables magnetic energy to be charged in the inductor 13.

When the slope-corrected second inductor current (Slope+IL2r) becomes identical to the corrected command current ILa*, the second current control unit 156 causes the high-voltage signal to be input to the reset terminal R of the flipflop 357, thus outputting (1) The low-voltage signal from the flipflop 357 to the gate of the third switch SW33 as the off command of the third gate signal GS23 via the second AND circuit 168 to thereby turn off the third switch SW33

(2) The high-voltage signal from the flipflop 357 to the gate of the fourth switch SW34 via the third inverter gate 170 to thereby turn on the fourth switch SW34

During the on state of the fourth switch SW34 with the third switch SW33 being in the off state, the second inductor current IL2r based on the magnetic energy charted in the inductor 13 flows through the second switch SW32, the fourth switch SW34, and the AC power source 200.

In particular, the second slope compensator 156 cyclically changes the slope ms of the second slope compensation signal Slope2 such that the slope ms takes (1) A local maximum value each time the AC voltage Vac reaches a corresponding zero-crossing point (see time t55 in FIGS. 21A and 21F)

(2) A local minimum value each time the AC voltage Vac reaches a corresponding peak (see time t54 in FIGS. 21A and 21F)

This configuration enables the duty factor D of the third switch SW33 to have a smaller value each time the AC voltage Vac reaches a corresponding zero-crossing point (t55) and a larger value each time the AC voltage Vac reaches a corresponding peak (t54) as compared with a case where the slope ms is set to a constant value. This therefore results in distortion in the alternating current Iac being suppressed during the negative half period P2 of the AC voltage Vac.

The fourth embodiment therefore achieves the same technical benefits as those achieved by the third embodiment.

MODIFICATIONS

The present disclosure is not limited to the above embodiments, and the above embodiments can be freely combined with each other or variably modified within the scope of the present disclosure.

Each of the control apparatuses 30 to 30C is configured to set the current correction Ic as a function of the AC voltage Vac, but the present disclosure is not limited thereto. Specifically, each of the control apparatuses 30 to 30C can be configured to set the current correction Ic as a function of the DC voltage Vdc.

As described above, each of the control apparatuses 30 to 30C can be configured to maintain the decreasing slope ma to be equal to or smaller than the predetermined threshold slope, making it possible to prevent the subharmonic oscillations of the inductor current ILr.

As described above, each AC-DC converter 10 is configured such that the decreasing slope ma of the inductor current ILr over time has the predetermined correlation with the absolute signal |Vac| of the AC voltage Vac and the DC voltage Vdc; this correlation can be expressed by the following equation (A):

$$ma = (Vdc - |Vac|)/L \qquad (A)$$

Similarly, each DC-AC converter 80 is configured such that the decreasing slope ma of the inductor current ILr over time has the predetermined correlation with the DC voltage Vdc; this correlation can be expressed by the following equation (C):

$$ma = Vdc/L \qquad (C)$$

An increase in the DC voltage Vdc therefore results in an increase of the absolute value of the decreasing slope ma, so that the duty factor D of a corresponding switch to be controlled in the peak current mode increases. For this reason, for preventing the subharmonic oscillations of the inductor current ILr, it is necessary to increase the slope ms of the slope compensation signal Slope.

Additionally, for properly setting the duty factor D of a corresponding switch to be controlled in the peak current mode, it is necessary to increase the current correction Ic with an increase of the slope ms.

For these necessities, the current corrector 40 of each control apparatus can be configured to increase the current correction Ic with an increase of the DC voltage Vdc.

This configuration enables each control apparatus to set the current correction Ic as a function of the DC voltage Vdc for each switching cycle Tsw to thereby set the slope ms as a function of the current correction Ic. This therefore results in suppression of distortion in the alternating current Iac while maintaining the slope ms that is required to prevent the subharmonic oscillations of the inductor current ILr.

The current corrector 40 can be configured to set the current correction Ic, i.e. the DC component, including ripples.

The control apparatus according to each of the first to fourth embodiments is configured to perform both correction of the pre-correction command current IL* based on the current correction Ic, and setting of the slope ms, thus reducing the degree of distortion in the alternating current Iac. The present disclosure is however not limited to the configuration.

Specifically, the control apparatus according to each of the first to fourth embodiments can be modified to perform only setting of the slope ms to thereby reduce the degree of distortion in the alternating current Iac. For example, the control apparatus according to this modification can be configured such that the inductor current ILr (or each of the first and second inductor currents IL1r and IL2r) and the pre-correction command current IL* are input to the comparator 352.

Each of the power conversion systems 100, 100A, 100A1, and 100A2, which aims to convert the AC voltage Vac into the DC voltage Vdc, is configured to calculate the slope ms in accordance with the equation (4), but the present disclosure is not limited thereto. Specifically, each of the power conversion systems 100, 100A, 100A1, and 100A2, which aims to convert the AC voltage Vac into the DC voltage Vdc, can be configured to change the slope ms of the slope compensation signal Slope such that the slope ms has (1) A positive peak for each of the positive half period P1 and the negative half period P2 of the AC voltage Vac (2) A negative peak between the positive and negative half periods P1 and P2 of the AC voltage Vac Each of the power conversion systems 100B and 100C, which aims to convert the D C voltage V d c into the AC voltage Vac, is configured to calculate the slope ms in accordance with the equation (7), but the present disclosure is not limited thereto. Specifically, each of the power conversion systems 100B and 100C, which aims to convert the D C voltage V d c into the AC voltage Vac, can be configured to change the slope ms of the slope compensation signal Slope such that the slope ms has (1) A negative peak for each of the positive half period P1 and the negative half period P2 of the AC voltage Vac (2) A positive peak between the positive and negative half periods P1 and P2 of the AC voltage Vac The control apparatus according to each embodiment is configured to generate the reference waveform sin ωt assuming that the power factor between the AC voltage Vac and the alternating current Iac is set to 100%, but the present disclosure can be applied to a case where the power factor between the AC voltage Vac and the alternating current Iac is set to a predetermined percent other than 100%.

The control apparatus according to this modification can be configured to generate a reference waveform sin (ωt+α); the angle α is defined based on the power factor such that the reference waveform sin (ωt+α) has a deviation in phase relative to the AC voltage Vac. Then, the control apparatus according to this modification can be configured to calculate the pre-correction command current IL* in accordance with the reference waveform sin (ωt+α). That is, the control apparatus according to this modification can be configured to calculate the deviation range parameter Δi indicative of how the pre-correction command current IL* based on the reference waveform sin (ωt+α) is deviated from the average Iave of the inductor current ILr, and set the slope ms based on the deviation range parameter Δi.

The power conversion system according to each embodiment can be configured to convert one of the AC voltage Vac and the DC voltage Vdc into the other thereof.

While the illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A control apparatus applicable to a power converter that includes an inductor and a switch connected to the inductor, and the power converter converting one of an alternating-current voltage input into a direct-current voltage and a direct-current voltage input into an alternating-current voltage, the control apparatus comprising:

a current obtainer configured to obtain a current flowing through the inductor as an inductor current;

a voltage obtainer configured to obtain the alternating-current voltage;

a slope compensation unit configured to:
generate, based on the alternating-current voltage obtained by the voltage obtainer, a slope compensation signal having a slope that depends on the alternating-current voltage; and
add the slope compensation signal to the inductor current obtained by the current obtainer, to generate an output current including the inductor current and the added slope compensation signal; and a current controller configured to:
control on-off switching operations of the switch in a peak current mode to thereby cause the output current to follow a sinusoidal command current that depends on the alternating-current voltage.

2. The control apparatus according to claim 1, wherein:
the slope compensation unit is configured to generate, based on the voltage obtained by the alternating-current voltage obtainer, the compensation signal such that:
the slope of the compensation signal changes in correlation with the alternating-current voltage.

3. The control apparatus according to claim 1, wherein:
the power converter is configured to convert the alternating-current voltage into the direct-current voltage; and
the slope compensation unit is configured to generate, based on the voltage obtained by the alternating-current voltage obtainer, the compensation signal such that the slope of the slope compensation signal changes to have:
a positive peak for each of a positive half period and a negative half period of the alternating-current voltage; and
a negative peak between the positive and negative half periods of the alternating-current voltage.

4. The control apparatus according to claim 3, wherein:
the slope compensation unit is configured to:
correct the command current based on a predetermined current correction to thereby generate a corrected command current; and
the current controller is configured to:
control on-off switching operations of the switch in the peak current mode to thereby cause the output current to follow the corrected command current in place of the command current.

5. The control apparatus according to claim 4, wherein:
the slope compensation unit is configured to calculate the slope of the slope compensation signal in accordance with the following equation:

$$ms = \frac{Ic - \frac{|Vac| \cdot \left(1 - \frac{|Vac|}{Vdc}\right) \cdot Tsw}{2L}}{\left(1 - \frac{|Vac|}{Vdc}\right) \cdot Tsw}$$

where:
ms represents the slope of the slope compensation signal;
Ic represents the current correction;
|Vac| represents an absolute value of the alternating-current voltage;
Vdc represents the direct-current voltage;
Tsw represents each cycle of the alternating-current voltage; and
L represents an inductance of the inductor.

6. The control apparatus according to claim 1, wherein:
the power converter is configured to convert the direct-current voltage into the alternating-current voltage; and
the slope compensation unit is configured to generate, based on the voltage obtained by the alternating-current voltage obtainer, the compensation signal such that the slope of the slope compensation signal changes to have:
a negative peak for each of a positive half period and a negative half period of the alternating-current voltage; and
a positive peak between the positive and negative half periods of the alternating-current voltage.

7. The control apparatus according to claim 6, wherein:
the slope compensation unit is configured to:
correct the command current based on a predetermined current correction to thereby generate a corrected command current; and
the current controller is configured to:
control on-off switching operations of the switch in the peak current mode to thereby cause the output current to follow the corrected command current in place of the command current.

8. The control apparatus according to claim 7, wherein:
the slope compensation unit is configured to calculate the slope of the slope compensation signal in accordance with the following equation:

$$ms = \frac{Ic - \frac{(Vdc - |Vac|) \cdot \left(\frac{|Vac|}{Vdc}\right) \cdot Tsw}{2L}}{\left(\frac{|Vac|}{Vdc}\right) \cdot Tsw}$$

where:
ms represents the slope of the slope compensation signal;
Ic represents the current correction;
|Vac| represents an absolute value of the alternating-current voltage;
Vdc represents the direct-current voltage;
Tsw represents each cycle of the alternating-current voltage; and
L represents an inductance of the inductor.

9. The control apparatus according to claim 1, wherein:
the slope compensation unit comprises:
a corrector configured to correct the command current based on a predetermined current correction to increase the command current, thus generating a corrected command current,
wherein:
the current controller is configured to:
control on-off switching operations of the switch in the peak current mode to thereby cause the inductor current, to which the slope compensation signal has been added, to follow the corrected command current in place of the command current; and
the slope compensation unit is configured to:
generate, based on the voltage obtained by the alternating-current voltage obtainer and the current correction, the slope compensation signal having the slope.

10. The control apparatus according to claim 4, wherein the current correction is a variable direct-current component.

11. The control apparatus according to claim 9, wherein:
the corrector is configured to set the current correction as a function of the direct-current voltage.

12. The control apparatus according to claim 9, wherein:
the corrector is configured to set the current correction as a function of a root-mean-square of the alternating-current voltage.

* * * * *